US012794840B2

(12) United States Patent
Li et al.

(10) Patent No.: US 12,794,840 B2
(45) **Date of Patent: *Nov. 10, 2026**

(54) INFORMATION REPLY METHOD AND APPARATUS, AND ELECTRONIC DEVICE, READABLE STORAGE MEDIUM AND PROGRAM PRODUCT

(71) Applicant: Beijing Bytedance Network Technology Co., Ltd., Beijing (CN)

(72) Inventors: Xinyi Li, Beijing (CN); Na Sun, Beijing (CN); Yujie Li, Beijing (CN); Ye Lin, Beijing (CN); Siqi Tan, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 68 days.

This patent is subject to a terminal disclaimer.

(21) Appl. No.: 18/593,401

(22) Filed: Mar. 1, 2024

(65) Prior Publication Data

US 2024/0203010 A1 Jun. 20, 2024

Related U.S. Application Data

(63) Continuation of application No. PCT/CN2022/114454, filed on Aug. 24, 2022.

(51) Int. Cl.
*G06F 3/0482* (2013.01)
*G06F 3/0484* (2022.01)
(Continued)

(52) U.S. Cl.
CPC ............ *H04L 51/10* (2013.01); *G06F 3/0482* (2013.01); *G06F 3/0484* (2013.01); *G06T 11/60* (2013.01);
(Continued)

(58) Field of Classification Search
CPC ................................................ G06F 3/048–05
See application file for complete search history.

(56) References Cited

U.S. PATENT DOCUMENTS

| | | | | |
|---|---|---|---|---|
| 10,271,079 | B1 * | 4/2019 | Woschank | H04N 21/4788 |
| 10,984,183 | B1 | 4/2021 | Clediere | |

(Continued)

FOREIGN PATENT DOCUMENTS

| | | | |
|---|---|---|---|
| CN | 109348299 | A | 2/2019 |
| CN | 108174023 | B | 11/2019 |

(Continued)

OTHER PUBLICATIONS thepreviewapp.com, "How to Answer Insta Story Q&A Questions during your Instagram Live?", published Dec. 19, 2018, available at <<https://thepreviewapp.com/answer-insta-story-qa-questions-instagram-live/>>, 6 pages (Year: 2018).*

(Continued)

*Primary Examiner* — Daniel Rodriguez

(57) ABSTRACT

The present disclosure relates to an information reply method and apparatus, and an electronic device, a readable storage medium and a program product. The method comprises: displaying an entry control for entering an information presenting page in a creation page for a first multimedia content, and displaying the information presenting page in response to a trigger on the entry control, wherein the information presenting page comprises one or more pieces of information comprising information obtained by replying to respective corresponding second multimedia content; receiving a trigger on a target information in the information presenting page; and in response to the trigger on the target information, displaying a sticker corresponding to the target (Continued)

information in the creation page for the first multimedia content, and replying to the target information through the first multimedia content.

20 Claims, 11 Drawing Sheets

(51) Int. Cl.

| | |
|---|---|
| ***G06T 11/60*** | (2006.01) |
| ***H04L 51/10*** | (2022.01) |
| ***H04L 51/216*** | (2022.01) |
| ***H04L 51/224*** | (2022.01) |
| ***H04L 51/52*** | (2022.01) |
| *G06Q 10/40* | (2026.01) |

(52) U.S. Cl.
CPC .......... *H04L 51/216* (2022.05); *H04L 51/224* (2022.05); *H04L 51/52* (2022.05); *G06Q 10/40* (2026.01); *G06T 2200/24* (2013.01)

(56) References Cited

U.S. PATENT DOCUMENTS 11,026,064 B1 6/2021 Debashish
11,093,120 B1 * 8/2021 Paul .................... G06F 3/0484
2009/0070407 A1 * 3/2009 Castle .................... H04H 60/04 709/203
2009/0282338 A1 * 11/2009 Bohms .................... G06F 16/58 715/719
2010/0017718 A1 * 1/2010 Bohms .................... G06F 16/41 715/719
2011/0307090 A1 * 12/2011 Hamazoe ................ G06F 30/17 700/104
2012/0150997 A1 * 6/2012 McClements, IV ........................ G06F 16/7867 709/217
2012/0221937 A1 8/2012 Patterson et al.
2013/0019154 A1 * 1/2013 Wolfston, Jr. ........ G06F 40/174 715/221
2013/0178961 A1 * 7/2013 Ly .......................... G11B 27/34 700/94
2013/0191763 A1 * 7/2013 Jones .................... G06F 3/0481 715/753
2013/0198656 A1 * 8/2013 Jones .................... H04L 65/403 715/753
2013/0227434 A1 * 8/2013 Jones .................... H04L 67/306 715/753
2013/0339886 A1 * 12/2013 Batham ................. G06F 3/0481 715/765
2014/0013230 A1 * 1/2014 Malone .................... H04N 5/76 715/723
2014/0089800 A1 3/2014 Kao et al.
2014/0274381 A1 9/2014 Kojo
2014/0372910 A1 * 12/2014 Alford Mandzic .... G06Q 10/40 715/753
2015/0020170 A1 * 1/2015 Talley ..................... H04L 63/08 726/4
2015/0222617 A1 * 8/2015 Ebersman ............... G06F 40/30 726/4
2016/0267081 A1 * 9/2016 Keene ................. G06F 16/4393
2016/0337304 A1 11/2016 Liu et al.
2017/0192651 A1 7/2017 Yang et al.
2017/0272476 A1 * 9/2017 Ciofalo ................. G06F 16/183
2017/0364372 A1 * 12/2017 Harpur ................ H04L 65/4015
2018/0255356 A1 9/2018 Zhao
2019/0268650 A1 * 8/2019 Avedissian ............ G06F 3/0481
2019/0288972 A1 9/2019 Morrison
2019/0324612 A1 10/2019 Du et al.
2020/0027172 A1 1/2020 Benfield et al.
2021/0035609 A1 * 2/2021 Zhao ...................... G11B 27/34
2021/0037195 A1 2/2021 Cutler et al.
2021/0042724 A1 2/2021 Rathod
2021/0287567 A1 * 9/2021 Singh .................... G06F 3/0481
2021/0334325 A1 10/2021 Ai et al.
2022/0101415 A1 3/2022 Devoy, III et al.
2022/0262405 A1 * 8/2022 Conlin .................. G06Q 10/06
2022/0317860 A1 10/2022 Zhou et al.
2024/0062443 A1 * 2/2024 Sun ......................... G06T 11/60
2024/0177247 A1 5/2024 Sun et al.
2025/0278430 A1 * 9/2025 DiBenedetto ......... G06F 16/735

FOREIGN PATENT DOCUMENTS

CN 111638832 A 9/2020
CN 112153288 A 12/2020
CN 112230812 A 1/2021
CN 112272302 A 1/2021
CN 112698769 A 4/2021
CN 113065081 A 7/2021
EP 4050468 A1 8/2022
JP 2018521387 A 8/2018
KR 2018-0061919 A 6/2018
KR 2021-0083578 A 7/2021

OTHER PUBLICATIONS

Martina Cicakova, "Introducing Labels: A New Way to Organize Your Questions", published May 9, 2019, available at <<https://blog.slido.com/introducing-labels-new-way-to-organize-questions/>>, 6 pages (Year: 2019).*
Emily Blackwood, "The beginner's guide to Instagram Live", archived on Sep. 20, 2020 on wayback machine: <<https://web.archive.org/>>, available at <<https://macpaw.com/how-to/instagram-live-stream>>, 8 pages (Year: 2020).*
Final Office Action mailed on Jul. 20, 2023, for U.S. Appl. No. 17/730,533, pp. 24.
Final Office Action mailed on Nov. 10, 2022, for U.S. Appl. No. 17/730,533, pp. 27.
International Search Report and Written Opinion received for PCT Patent Application No. PCT/CN22/114454, mailed on Nov. 11, 2022, 12 pages (6 pages of English Translation and 6 pages of Original Document).
Non-Final Office Action mailed on Jul. 21, 2022, for U.S. Appl. No. 17/730,533, pp. 20.
Non-Final Office Action mailed on Mar. 30, 2023, for U.S. Appl. No. 17/730,533, pp. 27.
Office action received from Indian patent application No. 202427016749 mailed on Jul. 8, 2025, 7 pages.
Communication pursuant to Rules 70(2) and 70a(2) EPC for European Application No. 22863261.8, mailed Dec. 3, 2024, 1 page.
Extended European Search Report for European Application No. 22863261.8, mailed Nov. 15, 2024, 10 pages.
Office action received from Korean patent application No. 10-2024-7008959 mailed on Sep. 4, 2025, 12 pages (4 pages English Translation and 8 pages Original Copy).
Office action received from Chinese patent application No. 202111026992.1 mailed on Mar. 6, 2026, 16 pages (8 pages English Translation and 8 pages Original Copy).
Notice of Allowance received from Japanese patent application No. 2024514419 mailed on Sep. 8, 2026, English Translation, 5 pages.

* cited by examiner

INFORMATION REPLY METHOD AND APPARATUS, AND ELECTRONIC DEVICE, READABLE STORAGE MEDIUM AND PROGRAM PRODUCT

CROSS-REFERENCE TO RELATED APPLICATIONS

This application is a continuation of International Application No. PCT/CN2022/104880, filed on Jul. 11, 2022, which claims priority to a Chinese Patent Application No. 202111026992.1, filed Sep. 2, 2021 entitled as "INFORMATION REPLY METHOD, APPARATUS, ELECTRONIC DEVICE, READABLE STORAGE MEDIUM AND PROGRAM PRODUCT", both of the aforementioned applications are hereby incorporated by reference in their entireties.

FIELD OF THE INVENTION

The disclosure relates to the technical field of Internet, in particular to an information reply method, apparatus, electronic device, readable storage medium and program product.

BACKGROUND

With continuous development of Internet technology, users often want to reply to comment information and/or question information for multimedia content when they are watching the multimedia content through a client. At present, when users reply to the comment information and/or question information for multimedia content, only after they find the multimedia content first, display the comment area on a playing interface of the multimedia content, and then find the comment information and/or question information in the comment area, the users can reply to the comment information and/or question information.

DISCLOSURE OF THE INVENTION

In order to solve the above technical problems or at least partially solve the above technical problems, the present disclosure provides an information reply method, apparatus, electronic device, readable storage medium and program product.

In a first aspect, the present disclosure provides a method of information replying method, including:

- displaying an entry control for entering an information presenting page in a creation page for a first multimedia content, and displaying the information presenting page in response to a trigger on the entry control, wherein the information presenting page includes one or more pieces of information including information obtained by replying to respective corresponding second multimedia content;
- receiving a trigger on a target information in the information presenting page;
- in response to the trigger on the target information, displaying a sticker corresponding to the target information in the creation page for the first multimedia content, and replying the target information through the first multimedia content.

In some possible embodiments, displaying an entry control for entering an information presenting page in a creation page for a first multimedia content, and displaying the information presenting page in response to a trigger on the entry control, includes:

- receiving a trigger on a first entry control in a capturing page for the first multimedia content, wherein the creation page includes the capturing page;
- displaying the information presenting page in response to the trigger on the first entry control in the capturing page.

In some possible embodiments, displaying an entry control for entering an information presenting page in a creation page for a first multimedia content, and displaying the information presenting page in response to a trigger on the entry control, includes:

- displaying a sticker page in an editing page for the first multimedia content, wherein the creation page includes the editing page;
- receiving a trigger on a second entry control in the sticker page to display the information presenting page.

In some possible embodiments, displaying the sticker page in the editing page for the first multimedia content includes:

- receiving a trigger on a third entry control in the editing page for the first multimedia content;
- displaying the sticker page in the editing page in response to the trigger on the third entry control in the editing page, wherein the sticker page includes the second entry control, and the second entry control is used for entering the information presenting page.

In some possible embodiments, in the information presenting page, each area corresponding to each information has the same width, and one or more information are displayed in two columns.

In some possible embodiments, the receiving the trigger on the target information in the information presenting page includes:

- receiving triggers corresponding to a plurality of target information in the information presenting page respectively;
- the displaying the sticker corresponding to the target information in a creation page for the first multimedia content in response to the trigger on the target information includes:
- in response to triggers corresponding to the plurality of target information respectively, displaying first stickers corresponding to the plurality of target information respectively in the creation page for the first multimedia content.

In some possible embodiments, the replying to the target information through the first multimedia content includes:

- displaying a publication page corresponding to the first multimedia content, wherein the publication page includes a target link, wherein the target link is used for display in the playing page for the first multimedia content;
- publishing the first multimedia content and the target link in response to an trigger on a publication control in the publication page.

In some possible embodiments, the replying to the target information through the first multimedia content further includes:

- sending the first multimedia content and the target information to a server device, so that the server device sends a notification message to a client associated with the target information; wherein the notification message is used to notify the associated client that the first multimedia content is used to replay to the target information.

In a second aspect, the present disclosure provides an information reply apparatus, including:

a displaying module, configured to display an entry control for entering an information presenting page in a creation page for a first multimedia content, and display the information presenting page in response to a trigger on the entry control, wherein the information presenting page includes one or more pieces of information including information obtained by replying to respective corresponding second multimedia content;

a receiving module configured to receive a trigger on a target information in the information presenting page;

the displaying module is further configured to, in response to the trigger on the target information, display a sticker corresponding to the target information in the creation page for the first multimedia content, and a replying module, configured to reply the target information through the first multimedia content.

In a third aspect, the present disclosure provides an electronic device, including a memory, a processor and computer program instructions;

the memory is configured to store the computer program instructions;

the processor is configured to execute the computer program instructions to carry out the method of information replying according to any one of the first aspects.

In a fourth aspect, the present disclosure provides a readable storage medium, including computer program instructions that, when running on an electronic device, cause the electronic device to carry out the method of information replying according to any one of the first aspects.

In a fifth aspect, the present disclosure provides a program product, including computer program instructions;

the computer program instructions are stored in a readable storage medium, and at least one processor of an electronic device reads the computer program instructions from the readable storage medium; the at least one processor executes the computer program instructions, so that the electronic device carries out the method of information replying according to any one of the first aspects.

DESCRIPTION OF THE DRAWINGS

The accompanying drawings, which are incorporated into and constitute a part of this specification, illustrate embodiments consistent with this disclosure and, together with the description, serve to explain the principles of this disclosure.

In order to more clearly explain the embodiments of this disclosure or the technical solutions in the prior art, the following will briefly introduce the drawings that need to be used in the description of the embodiments or the prior art. Obviously, for those ordinary skilled in the field, other drawings can be obtained according to these drawings without paying creative effort.

DETAILED DESCRIPTION OF PREFERRED EMBODIMENTS

Figure 1A:
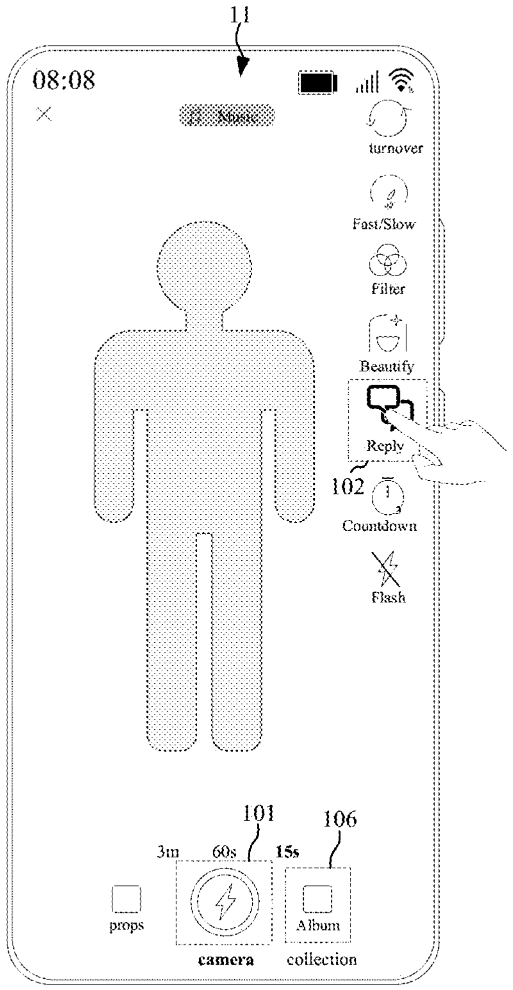
FIGS. 1A to 1R are schematic diagrams of human-machine interaction interfaces according to embodiments of the disclosure.

In order to better understand the above objects, features and advantages of the present disclosure, the solution of the present disclosure will be further described below. It should be noted that the embodiments of the present disclosure and the features in the embodiments can be combined with each other without conflict.

In the following description, many specific details are set forth in order to fully understand the present disclosure, but the present disclosure may be implemented in other ways different from those described herein; obviously, the embodiments in the specification are only a part of the embodiments of the present disclosure, not all of them.

The above-mentioned reply mode in the prior art has more operation steps for users and is not flexible enough, which obviously affects users' interest in reply.

Illustratively, the present disclosure provides an information reply method, apparatus, electronic device, readable storage medium and program product, wherein the method provides an entry control for an information presenting page in a creation page for a first multimedia content, and based on the entry control, users can enter the information presenting page, and users can view the information presented in the information presenting page and select a target information to which they want to reply therefrom, thus reducing complexity of user operation; after that, the target information is displayed in the creation page for the first multimedia content in the form of sticker, so that the first multimedia content is associated with the target information, and replying to the target information in the form of multimedia can be implemented, which not only enriches the reply manners, enhances the interest of users in replying to the target information, while improving the probability of users creating and publishing multimedia content.

In addition, replying to the target information mentioned in this disclosure may include: replying to the target information, or commenting on the target information, or questioning about the target information, etc.

In addition, replying to the target information in the form of multimedia mentioned in this disclosure can be interpreted as replying to the target information with multimedia contents, or replying to the target information with multimedia contents and links associated with the target information, or replying to the target information with multimedia contents, links associated with the target information and text contents. Among them, the multimedia contents mentioned in this disclosure include, but is not limited to, audio and/or video, wherein the video can be a video that has been captured or recorded in an electronic device, or a video that users captured in real time when creating.

Among them, the information presenting page mentioned in this disclosure is used to present one or more pieces of information, and the information in the information presenting page may include collected information, recommended information, invited-to-answer information, and so on. In the information page presentation, each piece of information corresponds to a second multimedia content, and the second multimedia contents corresponding to a plurality of pieces of information respectively may be the same or different, which is not limited in this disclosure. And the information may include information about commenting on, questioning about the corresponding second multimedia, replying to existing comments and so on. According to the disclosure, in the information presenting page, the information can be expressed by text, emoticon, picture, link, animation, symbol, number, time, etc. The presentation form or expression form of the information in the information presenting page is not limited in the present disclosure.

The target information mentioned in this disclosure is associated with a respective corresponding second multimedia content, and the target information may include information about such as commenting on, replying to or questioning about the respective corresponding second multimedia content. In some embodiments, the target information may include comment information, reply information and/or question information. The information can be expressed by text, emoticon, picture, link, animation, symbol, number, time, etc. In addition, the target information can also be expressed in sentence patterns such as statement, question, exclamation and rhetorical question, etc. The presentation form or expression form of the target information is not limited in the present disclosure.

In addition, the creation page for the first multimedia content mentioned in this disclosure may include a capturing page and/or an editing page. The capturing page is used to obtain image materials of the first multimedia content, and the editing page is used to clip the image materials to obtain the first multimedia content; the page layouts of capturing page and editing page are not limited in the present disclosure. And The duration, aspect ratio, resolution and specific contents of the first multimedia content are not limited in the present disclosure.

Among them, the editing page can also be referred to as other names, such as clipping page, production page, etc., which is not limited in the present disclosure.

The method of information replying provided in this disclosure can be realized by electronic devices, or applications (apps) and web pages in the electronic devices. Electronic devices may include mobile phones, tablet computers, wearable electronic devices, vehicle-mounted devices, augmented reality (AR)/virtual reality (VR) devices, notebook computers, ultra-mobile personal computer (UMPC), netbooks, personal digital assistant (PDAs), smart TVs, smart screens, high-definition TVs, 4K TVs, smart speakers, smart projectors and other smart home devices. The specific types of electronic devices are not limited in the present disclosure.

In this disclosure, the types of operating systems for the electronic devices are not limited, and can be, such as, Android system, Linux system, Windows system, iOS system, etc.

The present disclosure discloses an information reply method, apparatus, electronic device, readable storage medium and program product, wherein the method includes the following steps: displaying an entry control for entering an information presenting page in a creation page for a first multimedia content, and displaying the information presenting page in response to a trigger on the entry control, wherein the information presenting page includes one or more pieces of information including information obtained by replying to respective corresponding second multimedia content; in response to the trigger on the target information, displaying a sticker corresponding to the target information in the creation page for the first multimedia content, and replying the target information through the first multimedia content. In the process of creating the first multimedia content, an entry control into the information presenting page is provided, and through the information page display, users can select the target information they want to reply or comment on, thus reducing the complexity of user operation; and that target information is display in the creation page for the first multimedia content in the form of sticker to correlate the first multimedia content with the target information, so as to reply or comment on the target information in the form of multimedia, which not only enriches the reply manners, enhances the interest of users in replying to the target information, but also improves the probability of users creating and publishing multimedia content.

Based on the foregoing description, the specific implementation of the methods of information replying provided by the embodiments of this disclosure will be described in detail below, taking the electronic device being a mobile phone and a video application program (referred to as Application 1 for short) having been installed in the mobile phone as an example, combined with the schematic diagrams of human-machine interaction interface provided by FIGS. 1A to 1R.

Figure 1B:
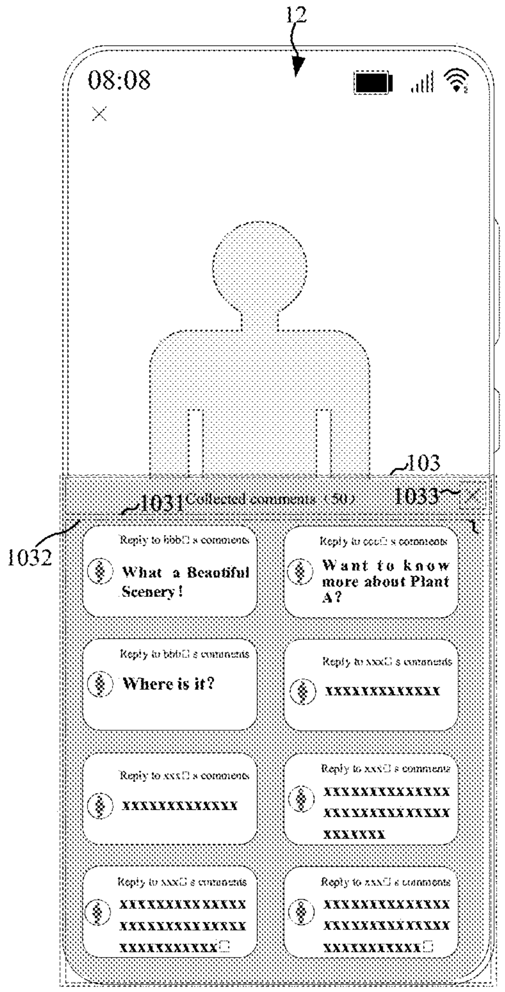
Figure 1C:
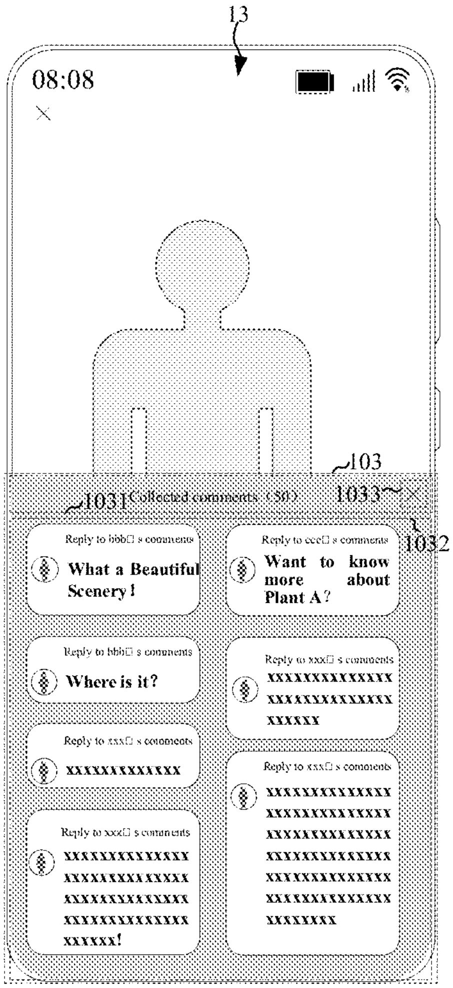
Figure 1D:
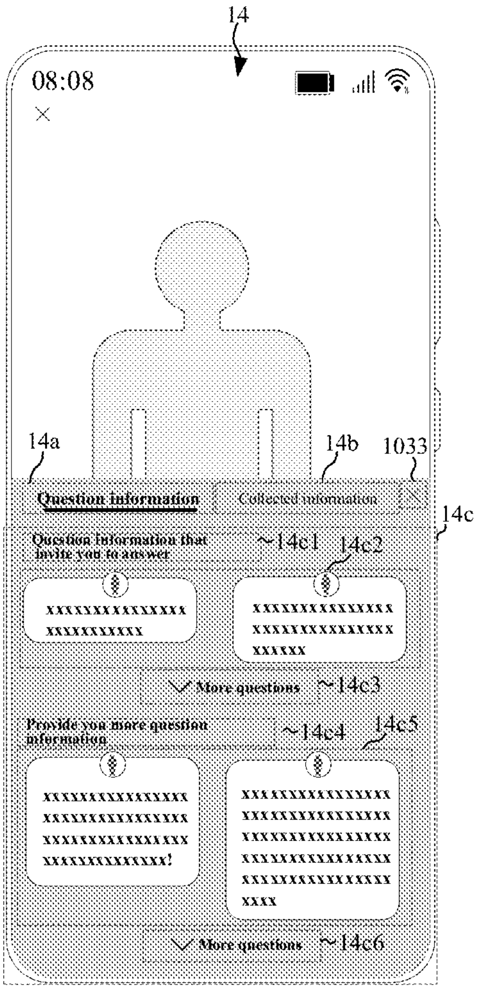
Figure 1E:
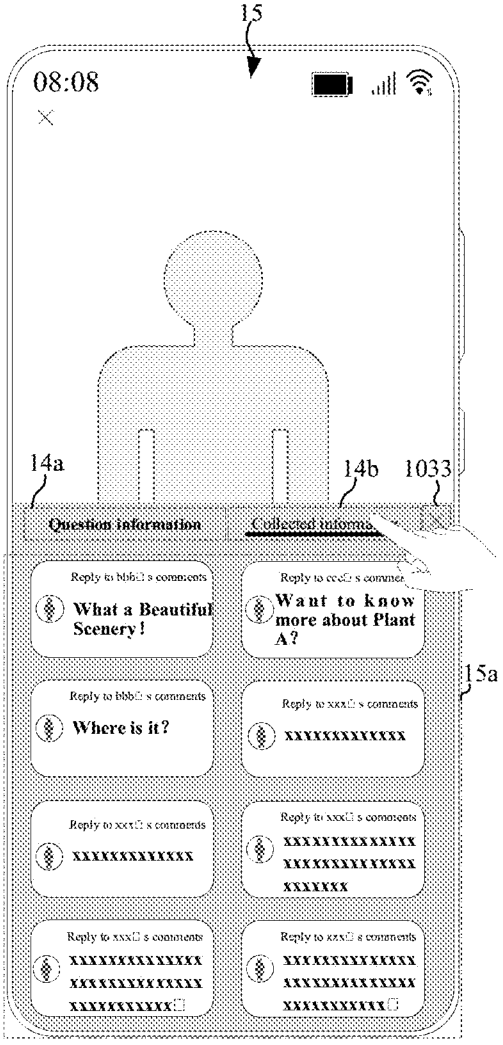
Figure 1F:
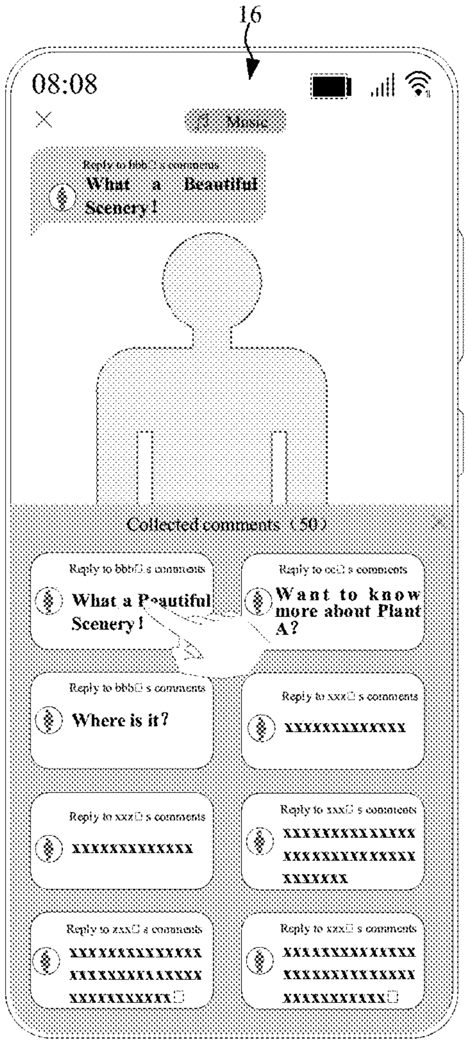
Figure 1G:
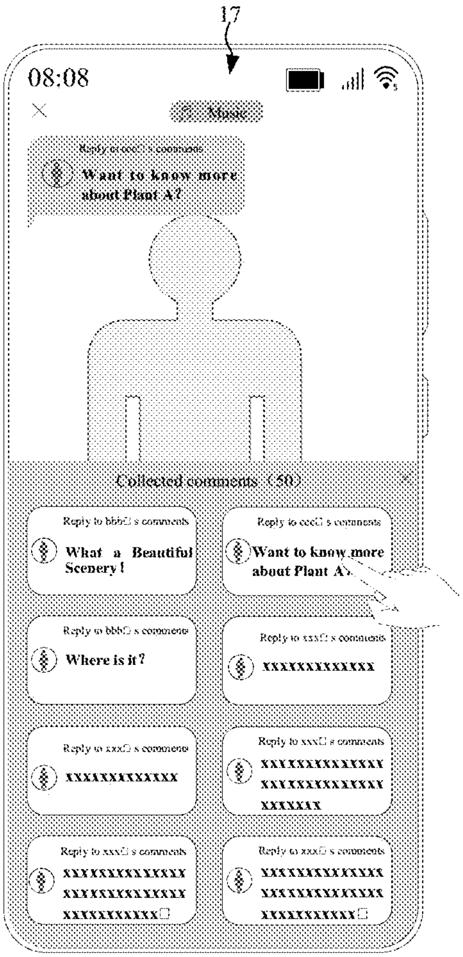
Figure 1H:
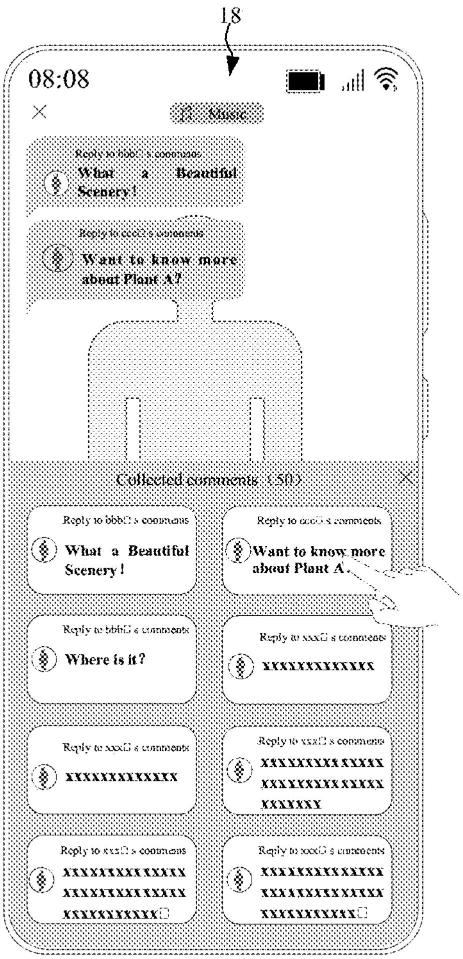
Figure 1I:
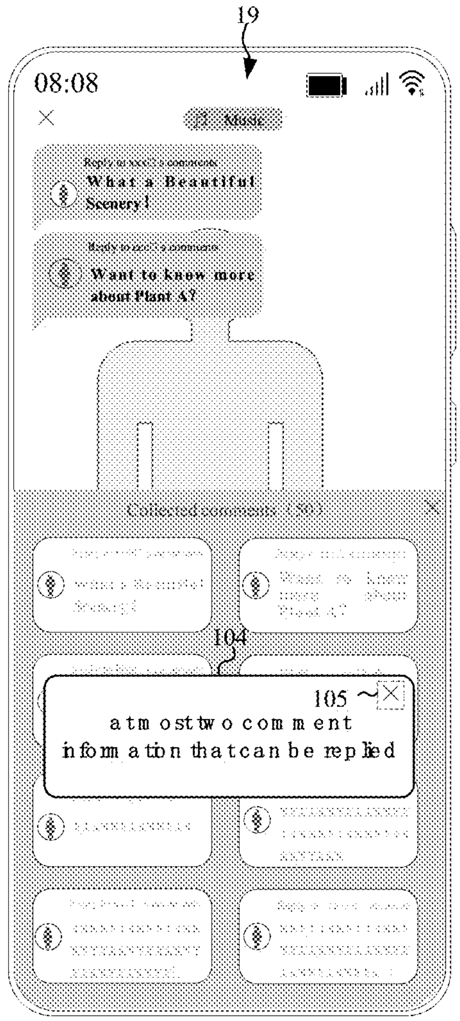
Figure 1J:
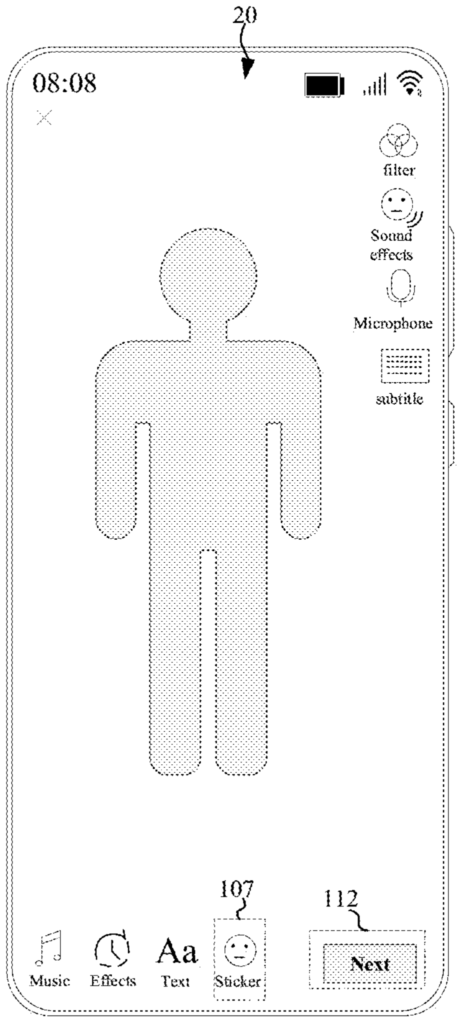
Figure 1K:
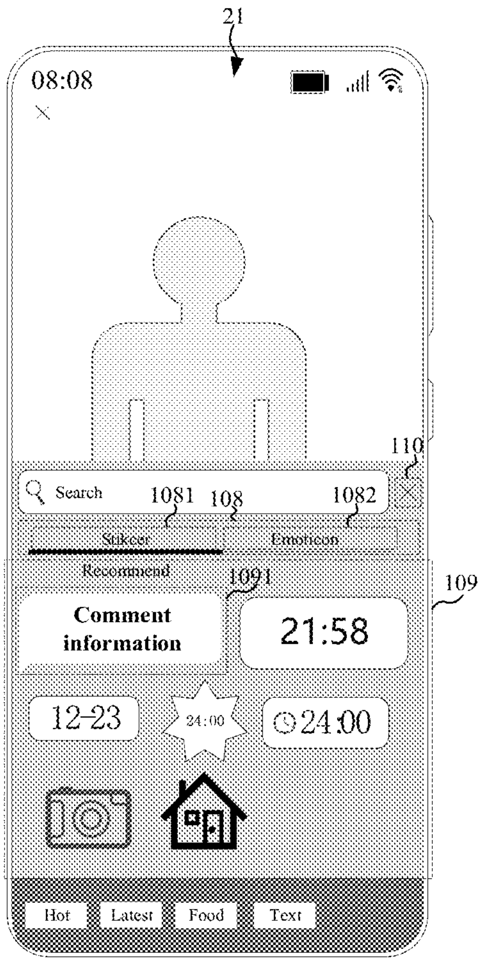
Figure 1L:
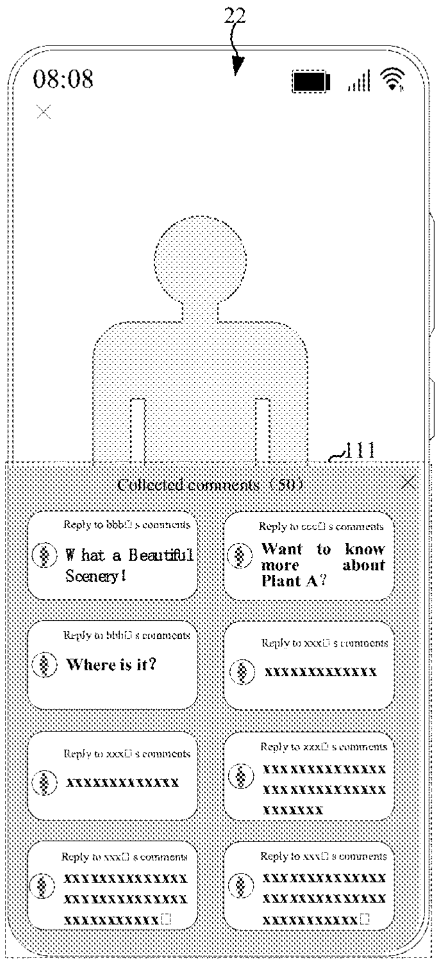
Figure 1M:
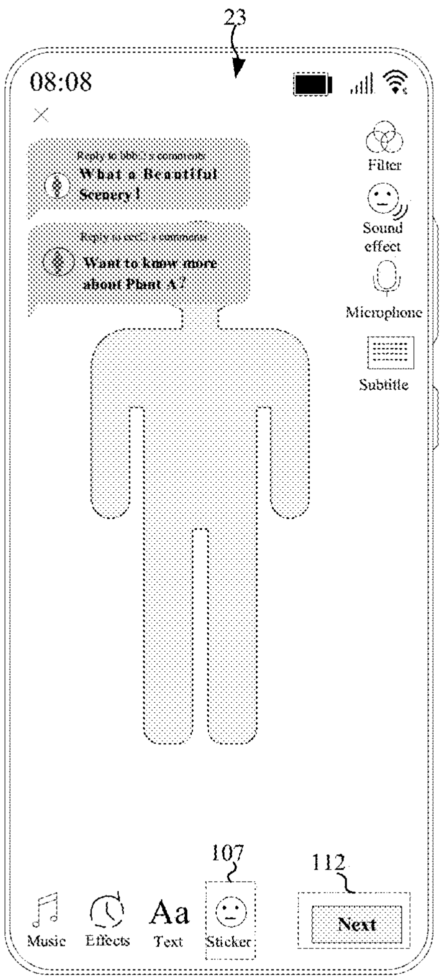
Figure 1N:
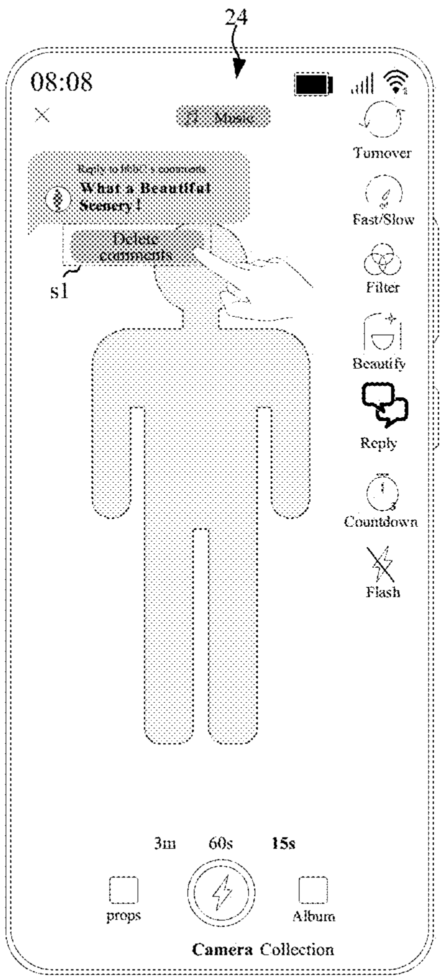
Figure 1O:
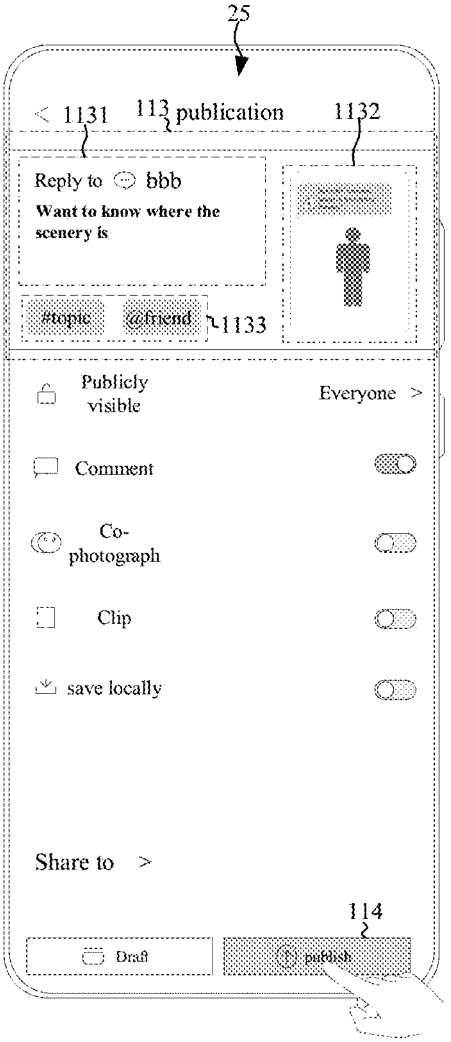
Figure 1P:
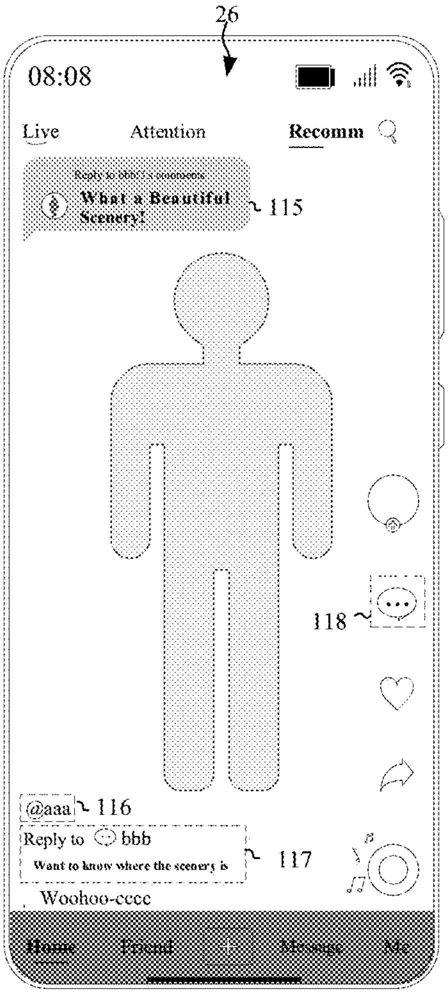
Figure 1Q:
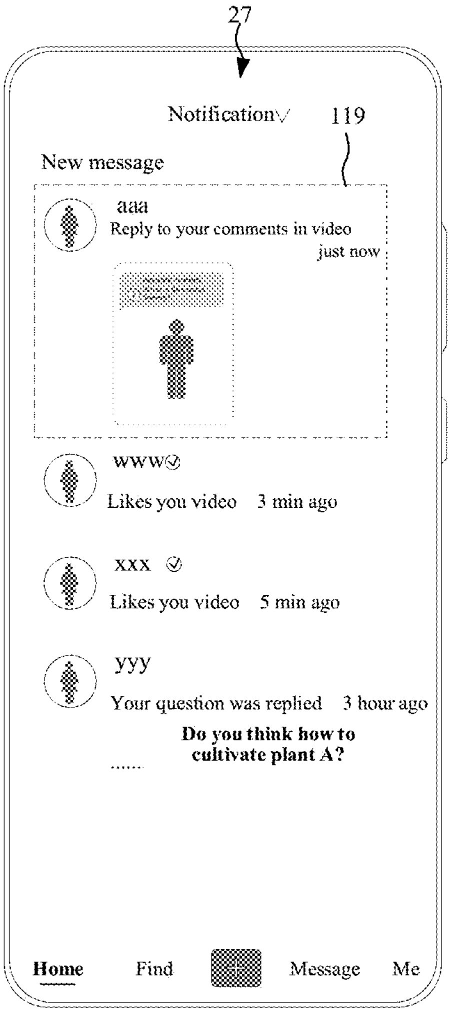
Figure 1R:
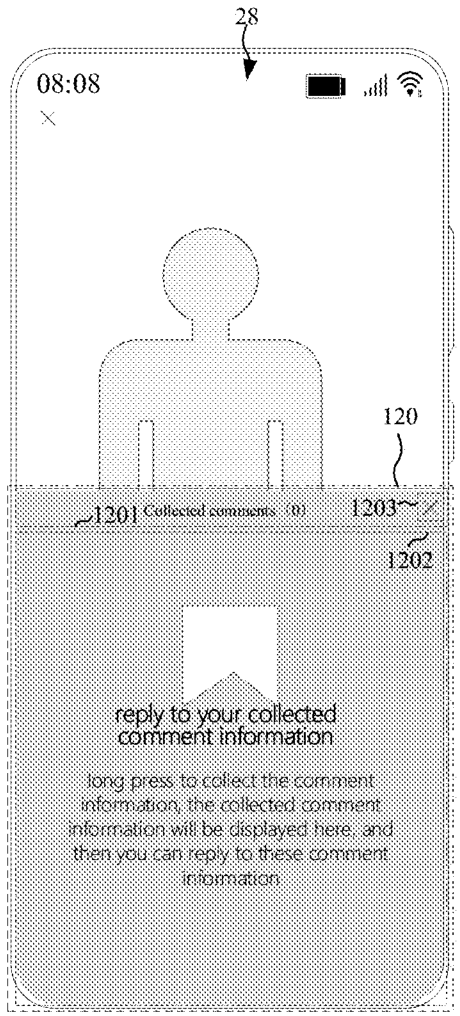

In FIGS. 1A to 1R, user 2 publishes a video 1, user 3 posts comment information 1 for the video 1, and a sticker 1 is used to display the comment information 1; user 4 posts comment information 2 for a video 2, and the sticker 2 is used to display the comment information 2; user 5 posts comment information 3 for the video 1, and sticker 3 is used to display the comment information 3; and the user 1 collects the comment information 1, the comment information 2 and the comment information 3.

On this basis, user 1 creates a first multimedia content (hereinafter referred to as video 0), and replies to one or more of the comment information 1, the comment information 2 and the comment information 3 in the form of multimedia.

In this scheme, the creation page for the video 0 can include a capturing page and an editing page. Therefore, next, it will be introduced in detail that based on the entry controls provided by the capturing page and/or the editing page respectively, a sticker corresponding to a target information to be replied is added, so as to reply to the target information in the form of multimedia.

Situation 1: Add the sticker corresponding to the target information to be replied based on the entry control provided by the capturing page.

For example, after Application 1 is started, Application 1 can display the user interface 11 as shown in FIG. 1A on the mobile phone, wherein the user interface 11 is a capturing page, and the capturing page can include a collection of multiple functions, and the capturing page is mainly used for acquiring image materials of video 0.

The manners of acquiring the image materials of video 0 are not limited in the present disclosure. For example, the image materials of video 0 can be photos and/or videos taken in real time, or photos and/or videos which are already taken and stored in a memory module of a mobile phone.

For example, as shown in FIG. 1A, the user interface 11 includes a capturing control 101, Application 1 receives a capturing start trigger (such as a click action or a long press action) for the capturing control 101, and in response to the trigger on the capturing control 101, Application 1 can start recording video, when the recorded video reaches a preset duration or Application 1 receives a capturing end trigger (such as a click action or a pop-up action) for the capturing control 101, Application 1 ends recording video, and the recorded video is the image materials of video 0.

It should be noted that Application 1 can also record multiple video clips by triggering the capturing control 101 multiple times, and the multiple video clips are the image materials of video 0.

The parameters of the image materials of video 0 are not limited in the present disclosure, they can be, such as, duration, aspect ratio, duration, filter effect, flash effect, resolution, etc.

Continue to refer to FIG. 1A, the user interface 11 includes: an entry control 102.

The entry control 102 is used to enter an information presenting page. The entry control 102 can be presented in the form of icon, text, symbol, picture, etc., or it can be presented in a manner of combining multiple forms. The display parameters, such as, color, size and the like, adopted by the entry control 102 are not limited in the present disclosure. For example, as shown in FIG. 1A, the entry control 102 is displayed in the form of "icon+text (such as reply)".

In combination with the foregoing, the information presenting page can display collected information, recommended information, invited-to-answer information, and so on. The following gives an exemplary introduction by taking the information presenting page displaying information collected by user 1 and the information presenting page displaying collected information, recommended information and invited-to-answer information as examples.

In some embodiments, Application 1 receives a trigger (such as a click action) for the entry control 102, and in response to the trigger on the entry control 102, Application 1 can exemplarily display the user interface 12 as shown in FIG. 1B on the mobile phone.

Referring to FIG. 1B, the user interface 12 includes an area 103 for displaying an information presenting page. The display parameters of the area 103, such as, size, color, display position, display transparency and so on, are not limited in the present disclosure. Among them, the information presenting page displayed by the area 103 can be set at the upper layer of the capturing page, so that the user can preferentially see each information in the information presenting page.

It should be noted that other areas in the user interface 12 except the area 103 can display pictures related to the capturing page, and users can see partial pictures in the capturing page through other areas except the area 103 when viewing the information presenting page.

In FIG. 1B, the area 103 may include an area 1031, an area 1032 and a control 1033.

The area 1031 is used to present the title of the information presenting page, where the title can be presented in the form of icon, text, digit, etc. For example, a content of "collected comments+number of collected comments" can be displayed in the area 1031, so that the user can clearly know that the page presents collected comment information and the number of collected information. For example, in FIG. 1B, "collected comments (50)" is shown as an example.

The area 1032 is used to display collected information. If Application 1 has collected multiple pieces of information, each piece of collected information can be presented in the area 1032 in the form of sticker. The display parameters of stickers corresponding to respective piece of information in the area 1032, such as size, shape, color, display position, display transparency and display order, etc., are not limited in the present disclosure.

In some embodiments, in the area 1032, stickers corresponding to respective pieces of information can have the same sizes, and can be arranged in the order from left to right and top to bottom. If the size of an area corresponding to each sticker cannot display the content related to the comment information, the content of the information can be folded displayed, and the user can view the content related to the information by triggering a sticker corresponding area, so that more collected information can be displayed in the area 1032.

In some embodiments, in the area 1032, the sizes of the areas of stickers corresponding to respective pieces of information may not be completely the same, so that the area corresponding to each sticker can display as many contents related to the information as possible, without folded displaying contents of the information, and users can directly and clearly obtain the contents related to the information. Among them, the content related to each piece of information may include, but not limited to, text content of the information published by the user, the avatar of the user who publishes the information, the nickname of the user who publishes the information, which user publishes multimedia content or comment information the information is replying to, etc.

In conjunction with the description about the area 1032, the areas of stickers corresponding to the information are displayed in multiple columns, for example, two columns, in the information presenting interface.

For example, in the user interface 12 shown in FIG. 1B, it is exemplarily shown that the areas of stickers corresponding to a plurality of pieces of collected information in the information presenting page have the same width and the same height, and are displayed in two columns in a manner of being aligned up and bottom.

Among them, taking the nickname of user 2 being "bbb", the nickname of user 3 being "ccc", the nickname of user 4 being "ddd" and the nickname of user 5 being "eee" as an example, sticker 1, sticker 2 and sticker 3 corresponding to comment information 1, comment information 2 and comment information 3 are displayed in the area 1032 as shown in FIG. 1B.

With Reference to FIG. 1B, taking sticker 1 as an example, the avatar and nickname of user 3 are displayed on the left of the area corresponding to sticker 1; the text content "Reply to bbb's comment" is displayed at the upper of sticker 1 to indicate that sticker 1 is a comment for user "bbb"; text content 1 "The scenery here is so beautiful!" is displayed at the bottom of text content, where the text content 1 is the text content of comment information 1 posted by user 3 for video 1.

Sticker 2 and sticker 3 are similar to sticker 1, which can be referred to that shown in FIG. 1B and will not be repeated here. It should be noted that because the text content 2 corresponding to sticker 2 is long, the text content can't be fully displayed in the area corresponding to sticker 2, so the text content 2 is folded displayed.

In FIG. 1B, "xxx" in "Reply to xxx's comments" represents the nickname of the user, and multiple "xxx" in FIG. 1B can represent different users; multiple "x" included in the comment information represent the text content of the collected information, and the number of "x" being different represents the lengths of the text contents of the comment information being different. Therefore, in FIG. 1B, the text contents of multiple stickers displayed in the area 1032 are not completely the same, which is only used to show an implementation manner in which the comment information is presented in the form of sticker in the information presenting page.

In FIG. 1B, it is exemplarily shown that the areas corresponding to stickers have the same width and the same height, and are arranged in two aligned columns for displaying the collected information. In actual scenes, they can also be displayed as one column, three columns or more columns. The number of columns is not limited in the present disclosure. In addition, how many columns are specifically used for displaying information can also be configured in conjunction with the state that the screen of mobile phone is in horizontal or vertical, and so on.

In some other embodiments, in response to the trigger on the first entry control 102 shown in FIG. 1A, the application 1 may also display the user interface 13 shown in FIG. 1C on the mobile phone, in which the user interface 13 exemplarily shows that in the information presenting page, the areas of stickers corresponding to a plurality of collected information are the same in width but not completely the same in height, and are displayed in two columns in an up-down alignment manner.

For example, as shown in FIG. 1C, in area 1032, the areas corresponding to sticker 1 and sticker 2 respectively are same in length and width, the area corresponding to sticker 3 is smaller than those corresponding to sticker 1 and sticker 2, and the areas corresponding to other stickers in area 1032 except sticker 1 to sticker 3 are also different in sizes, and they are displayed in two columns.

In the manner shown in FIG. 1C, the area corresponding to each sticker can display all contents related to the information, without folded displaying information, and users can directly and clearly view all contents of the collected information.

Among them, FIG. 1C exemplarily shows that the areas corresponding to stickers are the same in width but not completely the same in height, and are arranged in two aligned columns for displaying the collected information. In actual scenarios, they can also be displayed as one column, three columns or more columns. The number of columns is not limited in the present disclosure. In addition, how many columns are specifically used for displaying information can also be configured in conjunction with the state that the screen of mobile phone is in horizontal or vertical, and so on.

According to the embodiment of the disclosure, the information displayed in the information presenting page can be arranged and displayed in a preset order. For example, in the embodiments shown in FIG. 1B and FIG. 1C, when the information presenting page displays the collected information, the sticker corresponding to the latest collected comment information may be close to the upper part of the area 1032, and the sticker corresponding to the earliest collected comment information may be close to the bottom part of the area 1032.

Control 1033 is used to exit the information presenting page. The display parameters of the control 1033, such as display manner, display position, size, color, etc., are not limited in the present disclosure. For example, the control 1033 can be displayed in the form of icon, text, symbol, etc. The control 1033 can be located near the vertex of the area 103. In the embodiments shown in FIG. 1B and FIG. 1C, the control 1033 is displayed by the symbol “x”. In response to a trigger (such as a click action) for the control 1033, Application 1 can jump to the user interface 11 shown in FIG. 1A.

In the embodiments shown in FIG. 1B and FIG. 1C, the information collected by user 1 is displayed on the information presenting page. In some embodiments, the information presenting page can display various types of information, such as collected information, invited-to-answer information, more-question information and so on. Next, through the embodiments shown in FIG. 1D and FIG. 1E, the implementation of displaying collected information, invited-to-answer information and more-question information in the information presenting page will be described in detail.

In this disclosure, the information for being displayed in the information presenting page can be divided into various types, and the information presenting page is provided with entries to sub presenting pages corresponding to different types of information, so as to display various types of information classifiedly. And when the information presenting page is entered, the sub presenting page corresponding to any type of information can be displayed by default.

In the embodiments shown in FIG. 1D and FIG. 1E, it is assumed that a first type of information includes the invited-to-answer information and the more-question information, and a second type of information includes the collected information.

In some embodiments, Application 1 receives a trigger (such as a click action) for a first entry control provided in the area 102, and in response to the trigger on the first entry control, Application 1 exemplarily displays the user interface 14 shown in FIG. 1D on the mobile phone. In the user interface 14 shown in FIG. 1D, the information presenting page displays the sub presenting pages corresponding to the first type of information by default.

In FIG. 1D, the user interface 14 includes an area 14*a*, an area 14*b* and an area 14*c*.

Among them, the area 14*a* is used to provide an entry control for entering the sub presenting page corresponding to the first type of information. The area 14*b* is used to provide an entry control for entering the sub presenting page corresponding to the second type of information. The first type of information includes the invited-to-answer information and the more-question information, and the second type of information includes the collected information.

Among them, the area 14*a* can present the entry control for entering the sub presenting page corresponding to the first type of information in the form of icon, text, digit, symbol, picture, etc., similarly, the area 14*b* can present the entry control for entering the sub presenting page corresponding to the second type of information in the form of icon, text, digit, symbol, picture, etc. For example, as shown in FIG. 1D, the text content “question information” is displayed in area 14*a*, and the text content “collected information” is displayed in area 14*b*, FIG. 1D is only an example, and in practical application, area 14*a* and area 14*b* can be implemented in other ways, which are not limited in this disclosure.

Area 14*c* is used to display a sub presenting page corresponding to the first type of information.

Among them, the area 14*c* includes area 14*c*1, area 14*c*2, control 14*c*3, area 14*c*4, area 14*c*5 and control 14*c*6.

The area 14*c*1 is used to display a title information of a first sub-type included in the first type. The area 14*c*1 can perform the presentation in the form of icon, text, symbol, picture, etc., or can perform the presentation in a manner of combining multiple forms, the presentation manner of the area 14*c*1 is not limited in the present disclosure. For example, the first sub-type is the invited-to-answer information, and the text content “question information to invite you to answer” can be displayed in the area 14*c*1.

Area 14*c*2 is used to show the first subtype of information. The area 14*c*2 can present the first subtype of information in the form of sticker. In the area 14*c*2, the areas of stickers corresponding to the information may have the same or different sizes. The area of the sticker corresponding to the information can display the text content of the question invited to answer, the avatar, nickname of the user who publishes the question, and so on.

Referring to FIG. 1D, in the area 14*c*2, the area of the sticker corresponding to each piece of information may have the same width and different height, and the areas are displayed in two columns horizontally aligned according to the upper edge of the sticker area, and all relevant contents of each piece of information are fully displayed in the sticker area.

Of course, in the area 14*c*2, the area of the sticker corresponding to each piece of information may have the same width. And their heights are the same, if the information has more contents, the contents of information can be folded displayed. This is similar to the embodiment shown in FIG. 1C.

Control 14*c*3 is used to display more first sub-type of information. This disclosure does not limit the presentation manner of the control 14*c*3. For example, the control 14*c*3 can be presented in the form of icon, text, symbol, picture, etc., or it can be presented in a manner of combing multiple forms. For example, Application 1 receives a trigger (such as a click action) for the control 14*c*3, and Application 1 can display a preset number of first sub-type of information in the area 14*c*2. At this time, the size of the area 14*c*2 can be adjusted according to the preset number, and the control 14*c*3 is displayed below the preset number of first sub-type of information, so that the user can view more first sub-type of information.

The area 14*c*4 is used to display a title information of a second sub-type included in the first type. The area 14*c*4 can perform the exhibition in the form of icon, text, symbol, picture, etc., or can perform the presentation in a manner of combining multiple forms, and the presentation manner of the area 14*c*4 is not limited in the present disclosure. For example, the second subtype is the more-question information, which includes information that is closer to the information collected by users. How to determine more question information is not limited in the present disclosure, and the area 14*c*4 can display, for example, the text content "More question information for you".

Area 14*c*5 is used to present the second sub-type of information. The area 14*c*5 can display the second sub-type of information in the form of sticker. In the area 14*c*5, the areas of stickers corresponding to the information may have the same or different sizes. The area of the sticker corresponding to the information can display the text content of the question invited to answer, the avatar, nickname of the user who publishes the question, and so on. In the area 14*c*5, the areas of stickers corresponding to the information are displayed in two columns.

Referring to FIG. 1D, in the area 14*c*5, the area of the sticker corresponding to each piece of information may have the same width and different height, and the areas are displayed in two columns horizontally aligned according to the upper edge of the sticker area, and all relevant contents of each piece of information are fully displayed in the sticker area.

Of course, in the area 14*c*5, the area of the sticker corresponding to each piece of information may have the same width. And their heights are the same, if the information has more contents, the contents of information can be folded displayed. This is similar to the embodiment shown in FIG. 1C.

In FIG. 1D, control 14*c*6 is used to display more second sub-type of information. The presentation manner of the control 14*c*6 is not limited in the present disclosure. For example, the control 14*c*6 can be presented in the form of icon, text, symbol, picture, etc., or it can be presented in a manner of combing multiple forms. For example, Application 1 receives a trigger (such as a click action) for the control 14*c*6, and Application 1 can display a preset number of second sub-type of information in the area 14*c*6. At this time, the size of the area 14*c*5 can be adjusted according to the preset number, and the control 14*c*6 is displayed below the preset number of second sub-type of information, so that the user can view more second sub-type of information.

FIG. 1D exemplarily shows the implementation mode of a sub presenting page corresponding to the first type of information when the first type includes the first sub-type and the second sub-type. In actual scenarios, the first type may include more subtypes, and an implementation mode similar to that of the first subtype and the second subtype may also be adopted, which will be not repeated here for brevity.

In addition, FIG. 1D exemplarily shows that the areas corresponding to stickers have the same width and the same height, and are arranged in two aligned columns for displaying the collected information. In actual scenarios, they can also be displayed as one column, three columns or more columns. The number of columns is not limited in the present disclosure. In addition, how many columns are specifically used for displaying information can also be configured in conjunction with the state that the screen of mobile phone is in horizontal or vertical, and so on.

In some embodiments, Application 1 receives a trigger (such as a click action) for the first entry control provided in the area 102, and in response to the trigger on the first entry control, Application 1 exemplarily displays the user interface 15 shown in FIG. 1E on the mobile phone. In the user interface 15 shown in FIG. 1E, the information presenting page displays a sub presenting page corresponding to the second type of information by default.

Referring to FIG. 1E, the user interface 15 includes an area 15*a*.

The area 15*a* is used for displaying the sub presenting page corresponding to the second type of information. The presentation and implementation of area 15*a* can be performed in a manner similar to that of implementation of area 1032 in the previous embodiments shown in FIG. 1B and FIG. 1C, and will not be repeated here for brevity. FIG. 1E exemplarily shows that the areas of stickers corresponding to the collected information have the same size and are displayed in two columns aligned up and down.

In practical application, it is possible to switch between a sub presenting page corresponding to the first type of information and a sub presenting page corresponding to the second type of information, through the entry controls provided by the area 14*a* and the area 14*b* respectively.

In the embodiments shown in FIGS. 1D and 1E, the information presenting page further includes a control 1033 for exiting the information presenting page, and the control 1033 in FIGS. 1D and 1E has the same function as that of the control 1033 in the embodiments shown in FIGS. 1B and 1C. Reference can be made to the previous description of the embodiment shown in FIGS. 1B and 1C.

In the embodiments shown in FIG. 1D and FIG. 1E, the information displayed in the information presenting page can be arranged and displayed in a preset order. For example, in FIG. 1D, when the information presenting page displays the first type of information, according to the publication time, the sticker corresponding to the latest released question information invited-to-answer can be displayed close to the upper part near the area 14*c*2, and the sticker corresponding to the earliest released question information invited-to-answer can be displayed close to the bottom part of the area 14c2; in another example, in FIG. 1E, when the information presenting page presents the collected information, the sticker corresponding to the latest collected comment information can be located close to the upper part of the area 15a, and the sticker corresponding to the earliest collected comment information can be located close to the bottom part of the area 15a.

With reference to FIG. 1A continuously, the user interface 11 may also include other controls associated with the capturing page, such as a control for entering a music library, a control for exiting the capturing page, a control for adjusting the capturing mode, a control for entering a special effects presentation page, a control for entering a filter presentation page, and so on. The implementation manner of these controls associated with the capturing pages is not limited in the present disclosure.

By means of the manner shown in any of the embodiments shown in FIGS. 1B to 1E, one or more pieces of target information that want to reply can be selected from the information presenting page. Next, taking the embodiment shown in FIG. 1B as an example, we will continue to introduce the method of information replying provided by the present disclosure.

Continue to refer to the embodiment shown in FIG. 1B, assuming that Application 1 receives a trigger (such as a click action) for the sticker 1, and in response to the trigger on the sticker 1, Application 1 exemplarily displays the user interface 16 shown in FIG. 1F on the mobile phone, with reference to the user interface 16 shown in FIG. 1F, the sticker 1 has been displayed in the capturing page, and the sticker 1 cannot block the capturing picture or try not to block the capturing picture. For example, the sticker 1 can be displayed at a position near the vertex or side of the user interface.

On the basis of the embodiment shown in FIG. 1F, if Application 1 receives the trigger on the sticker 2, in some embodiments, Application 1 will replace the sticker 1 with the sticker 2, such as the embodiment shown in FIG. 1G; in some embodiments, application 1 will display the sticker 1 and the sticker 2 in the creation page (that is, the capturing page) on the basis of displaying the sticker 1.

In some embodiments, Application 1 jumps from the user interface 16 shown in FIG. 1F to the user interface 17 shown in FIG. 1G, and referring to the user interface 17 shown in FIG. 1G, sticker 2 has replaced sticker 1. That is, Application 1 can support replying to a single target information, and the picture area of the video blocked by the single target information is relatively small. Therefore, after video 0 and the information related to the target information are published, the whole picture in video 0 is concise and convenient for users to view.

In other embodiments, Application 1 jumps from the user interface 16 shown in FIG. 1F to the user interface 18 shown in FIG. 1H, and with reference to the user interface 18 shown in FIG. 1H, both the sticker 1 and the sticker 2 are displayed in the capturing page. That is, Application 1 can support replying to multiple comment information, and can meet a need that a user can reply to multiple messages at the same time through the same multimedia content, thus providing more possibilities for video creating.

In FIG. 1H, the sticker 1 corresponding to the comment information 1 and the sticker 2 corresponding to the comment information 2 can be displayed in a single column in the order of top-down alignment, and the areas corresponding to the sticker 1 and the sticker 2 respectively do not block each other. The display manners of stickers in the capturing page are not limited in the present disclosure.

As shown in FIG. 1G and FIG. 1H respectively, the display parameters of sticker 1 and sticker 2 in the capturing page may be different from those of sticker 1 and sticker 2 in the information presenting page, and the display parameters include, for example, display transparency, font size, etc. For example, the display transparencies of sticker 1 and sticker 2 in FIGS. 1G and 1H can be higher than that in the information presenting page, and the font sizes of sticker 1 and sticker 2 in FIGS. 1G and 1H can be smaller than that in the information presenting page, and these display parameters can be flexibly set, which are not limited in this disclosure.

In addition, in the embodiments shown in FIGS. 1G and 1H, sticker 1 and sticker 2 can be displayed at positions near the top or side of the capturing page, so that the areas corresponding to the stickers do not block or try not to block the captured picture.

In practice, when Application 1 supports the user to reply to multiple pieces of target information through video 0, the maximum number of target information that can be replied to can be set, so as to avoid a phenomenon that the user adds too many stickers corresponding to target information to cause stickers corresponding to these target information respectively to block the picture of video 0.

For example, in conjunction with the embodiments shown in FIG. 1F and FIG. 1H, it is assumed that Application 1 supports the user to reply to N (e.g., N=2) pieces of comment information through the first multimedia content, Application 1 receives a trigger on sticker 3, and in response to the trigger on sticker 3, Application 1 exemplarily displays the user interface 19 shown in FIG. 1I on the mobile phone, and with reference to the user interface 19 shown in FIG. 1I, Application 1 can display prompt information in the user interface 19, the prompt information being used to indicate the maximum number of target information that can be replied to in the form of multimedia currently.

In FIG. 1I, the user interface 19 includes an area 104.

The area 104 is used to display the text content of the prompt information. For example, in FIG. 1I, the text content "reply to at most two comment information" can be displayed in the area 104. Of course, the prompt information can also be implemented in other ways, such as other text content, animation special effects and so on.

In some embodiments, the area 104 may further include a control 105 for closing the area 104.

In some embodiments, the area 104 can also be closed in other ways, for example, when Application 1 receives a trigger (such as a click action) for any other arbitrary position outside the area 104, Application 1 closes the area 104; Alternatively, the area 104 can be closed in the manner of countdown. If the display time of the area 104 meets a preset time, Application 1 will automatically close the area 104. The implementation manner of the closing area 104 is not limited in the present disclosure.

It should be understood that on the basis of the embodiment shown in FIG. 1I, after closing the area 104, Application 1 will jump to the user interface 18 shown in FIG. 1H.

In the actual scenario, the user can first display a sticker corresponding to the target information that wants to reply in the capturing page in conjunction with the manners of the above-mentioned embodiments shown in FIGS. 1B to 1I, and then capture the image materials of video 0 in real time based on the capturing control 101 in the embodiment shown in FIG. 1A, or enter a material presentation page through the material presentation entry 106 in FIG. 1A to select the desired image materials.

After adding the sticker corresponding to the comment information that wants to reply and image materials, Application 1 can exemplarily display the editing page on the mobile phone, perform clipping through the editing page, and then publish the information related to video 0 and target information. In addition, a sticker for displaying the target information is contained in display of the play interface of video 0.

Among them, publishing the information related to the video 0 and the target information will be introduced in detail in the following embodiments.

Situation 2: The sticker corresponding to the target information is not added to the capturing page, and the sticker corresponding to the target information is added based on the entry control in the editing page.

In the situation 2, the image materials of video 0 are captured in real time based on the capturing control provided by the area 101 in the embodiment shown in FIG. 1A, or a material presentation page is entered through the material presentation entry 106 in FIG. 1A to select the desired image materials, after the image materials are added, Application 1 can exemplarily display the editing page on the mobile phone.

That is, in the situation 2, the sticker corresponding to the target information is not added through the first entry control provided in the capturing page, or the sticker corresponding to the target information cannot be added because the first entry control is not provided in the capturing page.

Application 1 can exemplarily display the user interface 20 shown in FIG. 1J on the mobile phone, and with reference to FIG. 1J, the user interface 20 is used to display an editing page, which may include controls or entry controls related to clipping.

In FIG. 1J, the user interface 20 includes a third entry control 107 for entering a sticker page, and the implementation manner of the third entry control 107 is not limited in this disclosure. The implementation manner of the third entry control 107 is similar to that of the first entry control, and reference can be made to the detailed description of the first entry control in the previous embodiments, which will not be repeated here for brevity. For example, in FIG. 1J, the third entry control 107 represented by the text "sticker" is shown as an example.

When the third entry control 107 is presented in the form of text, it can also be presented by texts of other language types, which is not limited in this disclosure.

In addition, the user interface 20 may also include controls related to clipping, for example, a control for adding automatic subtitles, a control for entering a filter display page, a sound effects control, a control for adding text, a control for entering a music library, a control for adding subtitles, a recording control, etc.

Application 1 receives a trigger (such as a click action) for the third entry control 107, and in response to the trigger on the third entry control 1107, Application 1 exemplarily displays the user interface 121 as shown in FIG. 1K on the mobile phone.

In FIG. 1K, the user interface 21 includes an area 108, an area 109 and a control 110.

The area 108 includes entry controls for entering sub-sticker presentation pages corresponding to different sticker types respectively. Referring to FIG. 1K, the area 108 includes a first sticker entry 1081 and a second sticker entry 1082. The first sticker entry 1081 is used to enter a sub-sticker presentation page corresponding to a first sticker type in Application 1, and the second sticker entry 1082 is used to enter a sub-sticker display page corresponding to a second sticker type. Of course, the area 108 may also include entries for sub-sticker display pages corresponding to other sticker types, which are not exemplified here.

When Application 1 jumps to the user interface 21, an entry control corresponding to any sticker type included in the area 108 is located by default, and the sticker page corresponding to the default entry control is displayed in the area 109. For example, if in the user interface 21, the first sticker entry 1081 is located by default, a sub-sticker display page corresponding to the first sticker type will be displayed in the area 109.

The specific classification of the above sticker types is not limited in this disclosure.

Control 110 is used to exit the sticker page. Application 1 receives a trigger (such as a click action) for the control 110, and Application 1 can jump to the user interface 20 shown in FIG. 1J. The control 110 can be implemented in the form of icon, text, digit, etc., and the implementation manner of the control 110 is not limited in this disclosure.

Continue to refer to FIG. 1K, the area 109 includes an entry control 1091.

The second entry control 1091 is used to enter an information presenting page, and the specific implementation manner of the second entry control 1091 is not limited in this disclosure. For example, the entry control 1091 can be presented in the form of icon, text, symbol, picture, etc., or it can be presented in a manner of combining multiple forms. The display parameters adopted for the second entry control 1091, such as color, size, animation effect, etc., are not limited in the present disclosure. For example, as shown in FIG. 1K, the second entry control 1091 is presented in the form of sticker, and the sticker is in the shape of a message, and there exists a text "comment information" inside the pattern of the message shape, so that the user can clearly know from the user interface 21 which sticker is the entry control for entering the information presenting page.

Of course, when the second entry control 1091 is displayed in the form of sticker, any other arbitrary shape can be adopted, such as right rectangle, rounded rectangle, irregular shape, etc. FIG. 1K is an example only.

The user interface 21 may also include entry controls for entering sub-sticker display pages corresponding to a plurality of sticker types, such as popular stickers, latest stickers, food stickers, text stickers and the like.

Application 1 receives a trigger (such as a click action) for the second entry control 1091, and in response to the trigger on the second entry control 1091, Application 1 can exemplarily display the user interface 22 as shown in FIG. 1L on the mobile phone.

Referring to FIG. 1L, the user interface 22 includes an area 111 for displaying an information presenting page, wherein the area 111 is implemented in a manner similar to that of the implementation of the sticker display pages in FIGS. 1B to 1E in the previous embodiments, and can refer to the detailed description of the previous embodiments shown in FIGS. 1B to 1E, which will not be repeated here for brevity.

After that, based on a trigger on a sticker corresponding to the target information in the information presenting page shown in FIG. 1L, Application 1 can display the corresponding sticker in the editing page. This implementation manner is similar to the implementation manner of the sticker display pages in FIGS. 1F to 1I in the previous embodiments, and can refer to the detailed description of the previous embodiments shown in FIGS. 1F to 1I, which will not be repeated here for brevity.

In addition, continue to refer to the embodiment shown in FIG. 1J, the user interface 20 further includes a control 112 for entering a publication page, and the application 1 receives a trigger (such as a click action) for the control 112, and in response to the trigger on the control 112, the application 1 can exemplarily display the publication page on the mobile phone, wherein the specific implementation of the publication page for video 0 will be introduced later. After that, the information related to video 0 and target information can be published. In addition, a sticker for displaying the target information is contained in display of the playing interface of video 0.

Among them, publication of the information related to the video 0 and the target information will be introduced in detail in the following embodiments.

It should be noted that before entering the publication page through the control 112, the sticker corresponding to the target information to be replied to has been added in the editing page.

Situation 3: A sticker corresponding to the target information has been added to the capturing page, and the sticker corresponding to the target information is added again based on the entry control provided by the editing page.

In the situation 3, one or more stickers corresponding to the target information have been added to the capturing page. For example, in the embodiment shown in FIG. 1G, the sticker 1 corresponding to the comment information 1 has been added to the capturing page through the first entry control provided by the capturing page; on this basis, after Application 1 jumps to the editing page, the sticker 1 corresponding to the comment information 1 will be displayed in the editing page. Then, more stickers corresponding to comment information can be added based on the entry controls provided by the editing page, or the sticker 1 corresponding to the comment information 1 displayed in the current editing page can be adjusted.

In the embodiment shown in FIG. 1H, the sticker 1 corresponding to the comment information 1 and the sticker 2 corresponding to the comment information 2 have been added to the capturing page through the first entry control provided by the capturing page. On this basis, after Application 1 jumps to the editing page, sticker 1 corresponding to comment information 1 and sticker 2 corresponding to comment information 2 both will be displayed in the editing page. Then, more stickers corresponding to comment information can be added based on the entry controls provided by the editing page, or sticker 1 corresponding to comment information 1 and/or sticker 2 corresponding to comment information 2 displayed in the current editing page can be adjusted.

On the basis of the embodiment shown in FIG. 1H, Application 1 exits the information presenting page and enters the editing interface, for example, the application 1 can exemplarily display the user interface 23 shown in FIG. 1M on the mobile phone, and with reference to FIG. 1M, the user interface 23 is used to display the editing page, which may include controls or entries related to clipping.

Compared with the user interface 20 shown in FIG. 1J, in the user interface 23 shown in FIG. 1M, the editing page displayed in the user interface 23 includes the sticker 1 corresponding to the comment information 1 and the sticker 2 corresponding to the comment information 2 added by the user through the first entry control provided by the capturing page.

In addition, the user interface 23 may also include controls related to clipping, for example, a control for adding automatic subtitles, a control for entering a filter presentation page, a sound effects control, a control for adding flower words, a control for entering a music library, etc.

On the basis of the embodiment shown in FIG. 1G, it is assumed that the sticker 1 corresponding to the comment information 1 has been added through the first entry control provided by the capturing page, and after jumping to the editing page, Application 1 can display the sticker 1 corresponding to the comment information 1 in the editing page.

Furthermore, based on the embodiment shown in FIG. 1G, since the number of stickers corresponding to comment information displayed in the editing page does not reach the maximum number of target information supported by Application 1 that can be replied to, after jumping to the editing page, it can enter the sticker page through the third entry control 107 in the editing page, and then enter the information presenting page through the second entry control 1091 in the sticker page, so as to add more stickers corresponding to target information in the editing page, so as to reply to multiple target information through video 0. The specific implementation manner can refer to the detailed description for situation 2, which will not be repeated for brevity.

For example, if Application 1 supports replying to at most 2 comment information, and sticker 1 corresponding to comment information 1 and sticker 2 corresponding to comment information 2 are added in the implementation manner in situation 2, Application 1 can exemplarily display the user interface 23 shown in FIG. 1M on the mobile phone. It should be understood that the upper limit of the number of target information that can be replied to is not limited in the present disclosure.

In addition, after the stickers corresponding to comment information are added through the capturing page or editing page, Application 1 also supports the adjustment of parameters of the stickers, such as positions, directions, sizes and the like.

For example, on the basis of the embodiment shown in FIG. 1F, assuming that the position of the sticker 1 is a first preset position, and the application 1 receives a trigger (such as a drag action) for the sticker 1, the sticker 1 is moved from the first preset position to a position indicated by the trigger.

Furthermore, it is assumed that the sticker 1 is currently in the horizontal direction, and when the application 1 receives a trigger (such as a rotation action) for the sticker 1, it moves the sticker 1 from the horizontal direction to an angle indicated by the trigger, for example, rotating 45 degrees to the left or rotating 45 degrees to the right, etc.

Furthermore, it is assumed that the sticker 1 is currently of a first size, and when the application 1 receives a trigger (such as a magnification action) for the sticker 1, it magnifies the sticker 1 from the first size to a second size indicated by the magnification action, for example, 1.5× magnification.

In addition, after the sticker corresponding to comment information has been added through the capturing page or the editing page, application 1 also supports deleting the sticker corresponding to the target information. For example, on the basis of the embodiment shown in FIG. 1F, and after exiting the information presenting page, application 1 receives a trigger (such as a long press action) for sticker 1 in the editing page, and in response to the trigger, application 1 can exemplarily display the user interface 24 shown in FIG. 1N on the mobile phone, which includes a deletion control s1 corresponding to sticker 1. In the actual scenario, one or more associated other controls corresponding to sticker 1 can be displayed in user interface 24, without being not limited to deletion control s1. The functions, quantities, implementation manners and so on of controls associated with stickers are not limited in the present disclosure.

Application 1 receives the trigger (such as click action) for the deletion control s1, and in response to the trigger on the deletion control s1, Application 1 deletes the sticker 1 corresponding to the comment information 1 displayed in the capturing page, that is, application 1 can jump to the user interface 11 shown in FIG. 1A in response to the trigger on the deletion control s1.

It should be noted that when a plurality of stickers corresponding to comment information have been added through the capturing page and stickers corresponding to comment information have been added through the editing page, the implementation manner of deleting the stickers corresponding to comment information can be similar to that in the above-mentioned FIG. 1N, which will not be repeated here for brevity. And after deleting some stickers corresponding to the target information, when the maximum number of target information supported by Application 1 is not exceeded, new stickers corresponding to the target information can be re-added, in a manner similar to that in the previous embodiment.

Continue to refer to the embodiment shown in FIG. 1M, the user interface 23 further includes a control 112, the application 1 receives a trigger (such as a click action) for the control 112, and in response to the trigger on the control 112, the application 1 can exemplarily display a publication page on the mobile phone.

The user interface 25 shown in FIG. 10 exemplarily shows a schematic diagram of a publication page.

In FIG. 1O, the user interface 25 is used to display the publication page. The specific implementation manner of the user interface 25 is not limited in the present disclosure.

In FIG. 1O, the user interface 25 may include an area 113 and a control 114.

The area 113 may include an area 1131, an area 1132 and an area 1133.

The area 1131 is used to display a link associated with the comment information 1, such as "Reply to+Reply ID+Account Nickname of the publisher of the comment information 1 (for example, user 3)" for displaying the link, and provide an input window for replying with text content, so that the text content replied by the user can be displayed in the input window.

The area 1132 is used to present the cover of the generated first multimedia content (i.e., video 0), such as showing thumbnails for a certain frame of playing picture of the first multimedia content and stickers displayed on the aforementioned capturing page or editing page in the form of cards, and providing a function of selecting the cover of the first multimedia content.

It should be noted that if the user interface 17 in the embodiment shown in FIG. 1G jumps to the publication page, in the area 1132, thumbnails for a certain frame of playing picture of the first multimedia content and the sticker 1 are displayed, and the function of selecting the cover of the first multimedia content is provided. If the embodiment shown in FIG. 1M jumps to the publication page, in the area 1132, thumbnails for a certain frame of playing picture of the first multimedia content as well as sticker 1 and sticker 2 are displayed, and the function of selecting the cover of the first multimedia content is provided. The user interface 25 shown in FIG. 1O is exemplified based on the embodiment shown in FIG. 1J.

The area 1133 is used to provide an entry for selecting the topic to which the first multimedia content belongs, so that the topic to which the first multimedia content belongs can be displayed in the area 1131, and to provide an entry for selecting a specific user, so as to conveniently remind the specific user to watch the first multimedia content.

The control 114 is used to publish the information related to the first multimedia content, that is, the application 1 can send at least the first multimedia content and the link associated with the comment information 1 to a server device, and can also send display parameters related to the sticker 1 and the text content replied by the user through the input window to the server device.

It should be noted that in addition to the area 113 and the control 114, the user interface 25 can also provide various entries, such as the user's right to view the first multimedia content, the right to comment on the first multimedia content, the right to edit the first multimedia content, the right to save the first multimedia content in the application 1, the right to share the first multimedia content and the right to store the first multimedia content in the draft box, and so on, which are not limited in this disclosure.

Application 1 receives a trigger (such as a click action) for the control 114, and Application 1 can send the information related to the first multimedia content to the server device.

Therefore, after the application 1 receives the information related to the first multimedia content from the server device, the application 1 can display the user interface 26 exemplarily shown in FIG. 1P on the mobile phone for displaying the first multimedia content. The specific implementation manner of the user interface 26 is not limited in the present disclosure.

Specifically, after receiving the user's reply to the comment information 1 in the form of multimedia, the application 1 can acquire the first multimedia content and display the sticker 1 containing the comment information 1 on the playing interface of the first multimedia content.

In FIG. 1P, the user interface 26 includes an area 115 and an area 116.

The area 115 is used to display the sticker 1 containing the comment information 1, and the area 115 can also provide an entry for replying to the comment information 1 in the form of multimedia. In addition, the area 115 can also be used to provide an entry for viewing/collecting the comment information 1 and/or information related to the comment information 1. The specific implementation manner of the area 115 is not limited in the present disclosure.

For example, when the application 1 receives a trigger (such as a long press action) for the area 115, the application 1 may display, in the area close to the sticker 1, one or more controls associated with the sticker 1 (i.e., comment information 1), such as a view control, a deletion control, a collection control, a reply entry for entering the capturing page, etc.

It should be noted that the area 115 provides an entry for replying to the comment information 1 in the form of multimedia, which is convenient for the user who publishes the multimedia content to reply to the comment information 1 in the form of multimedia again, and the user associated with the comment information 1 can also reply to the comment information 1 based on the entry provided by the area 115 for replying to the comment information 1 in the form of multimedia, which enriches the reply channels and is beneficial for users to publish multimedia content.

The area 116 is used to display the publisher of video 0 (that is, user 1). For example, "@+nickname of user 1's account" can be used to present the publisher of video 0. In this disclosure, the nickname of user 1's account is "aaa" as an example. In addition, after receiving the user's trigger such as clicking for the area 116, the application 1 can jump to the account page for the user 1 from the user interface 26.

In addition, in FIG. 1P, the user interface 26 may further include an area 117 and a control 118.

The area 117 is used to display a link associated with the comment information 1, which is used to trigger the display of the comment information 1. The manner of displaying this link is not limited in this disclosure. In some embodiments, the link can be presented by, for example, "Reply to+Reply ID+Account nickname of the publisher of comment information 1 (i.e., user 3)". Among them, the Reply ID can be represented in the form of icon, symbol, text, picture, etc. In addition, the specific implementation manner of displaying the comment information 1 after the link is triggered is not limited in the present disclosure.

In addition, the area 117 can also be used to display the text content replied by the user when the user replies to the comment information 1 in the form of multimedia.

The control 118 is used to trigger the display of the comment area in the playing interface of video 0. Among them, the comment area in the playing interface of video 2 is used to display the information about commenting on, replying to or asking questions to video 0, etc., which can be in the form of text, symbol, picture, animation, etc. Among them, the user can comment on, reply to or ask questions to the following which includes, not limited to, the playing interface of the video 0, sticker 1 displayed on the playing interface of video 0, comment information 1, information in the comment area in the playing interface of video 0, etc.

After the server device obtains the information related to video 0 about the user replying to comment information 1 from application 1, the server device can send a notification message a to a client associated with comment information 1.

Among them, the client associated with the comment information 1 include, but not limited to, a client that publishes the comment information 1, a client that "likes" the comment information 1, the client that comments on/replies to/questions about the comment information 1, a client that publishes the video 1 corresponding to the comment information 1, a client that "likes" the video 1 corresponding to the comment information 1, a client that comments on/replies to the video 1 corresponding to the comment information 1, the client specified by the user 1 in the publication page, etc.

The above notification message a is used to notify the above client associated with the comment information 1 that the user 1 has replied to the comment information 1 through the video 0. The specific implementation manner of the notification message a and the display manner at the client are not limited in the present disclosure.

Taking the publisher of video 1 (that is, user 2) as an example, after Application 1 receives the notification message a from the server device, Application 1 can display the user interface 27 exemplarily shown in FIG. 1Q on the mobile phone of the publisher of video 1.

Among them, the user interface 27 is used to display the notification page in the application 1, and the notification page is used to display various types of notification messages indicating such as receiving information, collecting, "liking" and commenting. The specific implementation manners of the notification page and the user interface 27 are not limited in the present disclosure.

In FIG. 1Q, the user interface 27 may include an area 119 for displaying the notification message a in the notification page, if the notification message a indicates that the user 1 created the video 0 to reply to the comment information 1, the notification message a may be presented in a form such as "avatar of user 1's account, nickname of user 1's account, identifier of replied text, reply time point and notification card", etc. Among them, the notification card may include a thumbnail composed of both a certain frame of playing picture of the first multimedia content and the sticker 1, and the sticker 1 may be displayed in suspension over the playing picture.

To sum up, Application 1 can also send a notification message a to the client associated with the comment information 1 through the server, so that a relevant user can timely know that a user (that is, user 1) has replied to the comment information 1 in the form of multimedia.

The user interface 27 may also include a control for a user to enter a homepage of Application 1, a search control, a control to enter a capturing page, a control to enter the notification page, controls to enter a personal account page, and so on, which will not be explained one by one.

In addition, on the basis of the above-mentioned situations 1 to 3, in some cases, there may be no information that can be displayed in the information presenting page, for example, Application 1 may not collect any comment information, do not have any invited-to-answer information, etc. Therefore, after entering the information presenting page based on the first entry control 102 of the capturing page or the second entry control 1091 of the editing page, Application 1 may exemplarily display the user interface 28 shown in FIG. 1R on the mobile phone.

In FIG. 1R, the user interface 28 includes an area 120 for displaying an information presenting page. Since there is no display information in the information presenting page, a prompt information can be displayed in the area 120, the prompt information is used to prompt the user to collect the comment information by long-pressing the comment information, the collected comments will be displayed in the area 120, and then the collected comments can be replied to.

For example, as shown in FIG. 1R, the area 120 includes an area 1201, an area 1202 and a control 1203; wherein the area 1201 is similar to the area 1031 in the area 103 whose detailed description can be referred to; the control 1203 is similar to control 1033 whose detailed description can be referred to.

The area 1202 is used to display a prompt information, and the implementation manner of the prompt information is not limited in the disclosure. The prompt information can be presented in a manner of combining icon and text. For example, in FIG. 1R, in the center of the area 1202, a corresponding icon, a text content "long press to collect the comment information, the collected comment information will be displayed here, and then you can reply to these comment information" and a text content "reply to your collected comment information" can be displayed, and such two text contents adopt different font sizes and weights.

It should be noted that the embodiments shown in FIGS. 1A to 1R are only examples of the methods of information replying provided by this disclosure. In actual scenarios, the layout of some pages, display parameters, and the implementation manners of controls and entries can be flexibly set according to requirements.

Based on the foregoing description, the following embodiments of this disclosure take application programs as examples, and explain the methods of information replying according to this disclosure in detail in conjunction with the drawings and application scenarios.

Figure 2:
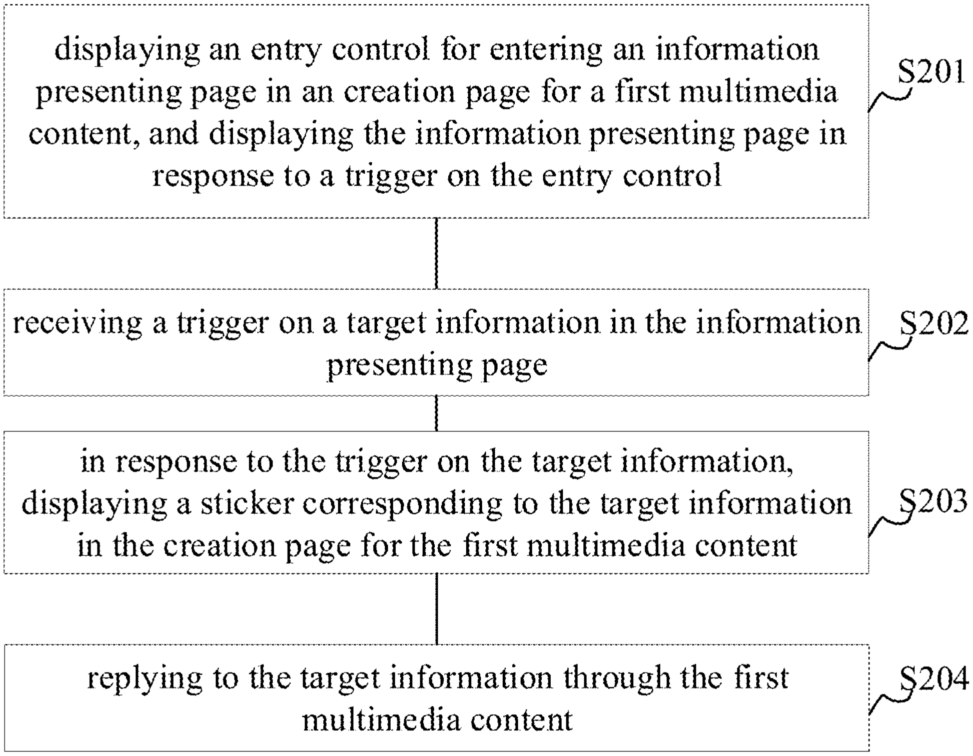
FIG. 2 is flowchart of a method of information replying according to an embodiment of the disclosure.

Referring to FIG. 2, which is a flow diagram of a method of information replying according to an embodiment of the present disclosure. As shown in FIG. 2, the method of information replying provided by this disclosure may include:

S201, displaying an entry control for entering an information presenting page in a creation page for a first multimedia content, and displaying the information presenting page in response to a trigger on the entry control.

In conjunction with the foregoing embodiments, it can be known that the creation page can include a capturing page and/or an editing page. In one possible implementation, a corresponding entry control can be set in the capturing page and/or the editing page, and the information presenting page can be entered through the entry control. Among them, the entry control can be set only in the capturing page, or only in the editing page, or in both the capturing page and the editing page.

In one possible implementation, Application 1 receives a trigger (such as click action) for the first entry control in the capturing page, and Application 1 displays the information presenting page on the electronic device.

According to some embodiments, the information presenting page can be presented in response to a trigger on a second entry control in a sticker page, which is displayed in an editing page for the first multimedia content, wherein the creation page includes the editing page. In another possible implementation, the application 1 receives a trigger (such as a click action) for a third entry control in the editing page, and Application 1 displays a sticker page on the electronic device, wherein the sticker page includes a second entry control for entering the information presenting page; Application 1 receives a trigger (such as click action) for the second entry control, and Application 1 displays the information presenting page on the electronic device. Note that the usage of the third entry control is optional.

To sum up, the information presenting page can be directly or indirectly entered based on the entry controls; for example, the information presenting page can be directly entered through the first entry control 102 in the capturing page in the embodiment shown in FIG. 1A, that is, the first entry control 102 is the first entry control in the above-mentioned embodiment; For another example, the sticker page is first entered through the third entry control 107 in the editing page in the embodiment shown in FIG. 1J, and then the information presenting page is entered based on the second entry control 1091 in the sticker page, such manner can be interpreted as indirectly entering the information presenting page, wherein the third entry control 107 is the third entry control in the above embodiment, and the second entry control 1091 is the second entry control in the above embodiment.

Among them, the information presenting page includes one or more pieces of information, and the information in the information presenting page includes respective information obtained by commenting on or replying to through one or more second multimedia contents. The specific implementation manner of the information presenting page is not limited in the present disclosure. Among them, the information in the information presenting page can include one or more types of information, such as collected comment information, collected reply information, question information about invitation to answer, question information for recommending answers, etc. How to determine each information displayed in the information presenting page is not limited in the present disclosure.

In addition, the information presenting page can be presented in the manner of the embodiment shown in FIG. 1B or FIG. 1C, for example, in the information presenting page, the sticker area corresponding to each piece of information can have the same width, and such areas can be displayed in two columns aligned up and down. Of course, more columns can be displayed. For details, please refer to the detailed description of the embodiments shown in FIGS. 1B to 1C.

Alternatively, the information presenting page can display different types of information in different sub presenting pages in the manner shown in FIG. 1E or FIG. 1F, and the information presenting page is provided with entry controls for entering the sub presenting pages corresponding to different types of information, and in each sub presenting page, the sticker area corresponding to each piece of information can have the same width, and such areas can be displayed in two columns aligned up and down, of course, more columns can be displayed. For details, please refer to the detailed description of the embodiments shown in FIGS. 1E to 1F.

The first multimedia content is used to reply to the target information in the information presenting page in the form of multimedia. The first multimedia content includes, but is not limited to, audio and/or video, wherein the image materials of the first multimedia content may include audio and/or video that has been captured or recorded in an electronic device (i.e., audio and/or video stored in a storage module of the electronic device); alternatively, the image materials of the first multimedia content may also include videos/photos taken in real time when the first multimedia content is being created. The parameters of the first multimedia content, such as duration, aspect ratio, sound effect, etc., are not limited in the present disclosure.

S202, receiving a trigger on the target information in the information presenting page.

S203. in response to the trigger on the target information, a sticker corresponding to the target information is displayed in the creation page for the first multimedia content.

The target information may include one or more pieces of information displayed in the information presenting page, and the target information is the information that the user wants to reply in the form of multimedia. In conjunction with the embodiments shown in FIG. 1D to FIG. 1O, these stickers 1 (or stickers 1 and stickers 2) displayed in the capturing page and/or editing page are stickers corresponding to the target information.

In response to the trigger on the sticker corresponding to the target information in the information presenting page, Application 1 can display the sticker corresponding to the target information in the creation page (i.e., the capturing page and/or the editing page), thereby associating the target information with the created first multimedia content.

In this scheme, the sticker corresponding to the target information can be added only through the first entry control provided by the capturing page, or a sticker page can be entered only through the third entry control provided by the editing page, and then the sticker corresponding to the target information can be added through the second entry control provided by the sticker page, or the stickers corresponding to the target information can also be added through the entry controls provided by the capturing page and the editing page respectively. The specific implementation can refer to the detailed description of embodiments shown in the above-mentioned situations 1 to 3 respectively, which will be not repeated here for brevity.

S204, replying to the target information through the first multimedia content.

The operation in step S204 can be implemented in a variety of manners. According to some embodiment, a publication page corresponding to the first multimedia content is displayed, wherein the publication page comprises a target link, wherein the target link is used for being displayed in a playing page for the first multimedia content, and then the first multimedia content and the target link are published in response to a trigger on a publication control in the publication page. According to some embodiments, the first multimedia content and the target information are sent to a server device, so that the server device sends a notification message to a client associated with the target information; wherein the notification message is used to notify the associated client that the first multimedia content has been used to reply to the target information.

In some embodiments, by adding the sticker corresponding to the target information, the first multimedia content can be bound with the target information, after the creating, the first multimedia content, information related to the first multimedia content and information related to the target information can be published through publication controls provided by the publication page.

Among them, the information related to the first multimedia content can include information about cover of the first multimedia content, information about topic to which the first multimedia content belongs, information specifying a client to be reminded, and so on, the information related to the target information can include a link corresponding to the target information, text contents of replying to target information, display parameters of the target information, and so on.

On one hand, Application 1 sends the first multimedia content, the information related to the first multimedia content and the information related to the target information to the server device, so that the server device can send a notification message to a client related to the target information. Among them, the client related to the target information can include: a client that publishes the target information, a client that "likes" the target information, a client that comments on/replies to/asks questions about the target information, a client that publishes a second multimedia content corresponding to the target information, a client that "likes" the second multimedia content corresponding to the target information, and a client that comments on/replies to the second multimedia content corresponding to the target information.

The server device can send the notification message through one or more clients related to the target information, and the notification message is displayed in the notification page of the clients related to the target information, wherein the notification page is exemplarily shown in FIG. 1Q, and of course, the notification page can be implemented in other ways, and the specific implementation manner of the notification page is not limited in the present disclosure.

On the other hand, Application 1 can also obtain the published first multimedia content and play the first multimedia content on an electronic device, and a playing page for the first multimedia content includes a sticker corresponding to the target information. Application 1 can also display, in the playing page for the first multimedia content, other information associated with the first multimedia content, such as a publisher of the first multimedia content, a link associated with the target information for triggering display of the target information, the text content replied by the publisher of the first multimedia content when the publisher replies to the target information in the form of multimedia, and so on.

In conjunction with the foregoing embodiments, the first multimedia content can be used to reply to multiple pieces of target information, therefore, stickers corresponding to multiple pieces of target information respectively can all be displayed in the playing page for the first multimedia content, and the information related to each piece of target information can be displayed in the playing page for the first multimedia content in a preset way, for example, according to chronological order of adding target information pairs, the information related to target information can be arranged and displayed in order from top to bottom. The specific implementation manner can refer to the detailed description of the embodiment shown in FIG. 1P, which will not be repeated here for brevity.

According to the method provided by this embodiment, the entry control for the information presenting page is provided in the creation page for the first multimedia content, the information presenting page can be entered based on the entry control, and the target information that wants to be replied can be selected from the information presenting page, thereby reducing the complexity of user operation; then, the target information is displayed in the creation page for the first multimedia content in the form of sticker, so as to bind the created first multimedia content with the target information, and realize replying to the target information in the form of multimedia, which not only enriches the reply manners, enhances the interest of users in replying to the target information, but also improves the probability of users creating and publishing the multimedia content.

Figure 3:
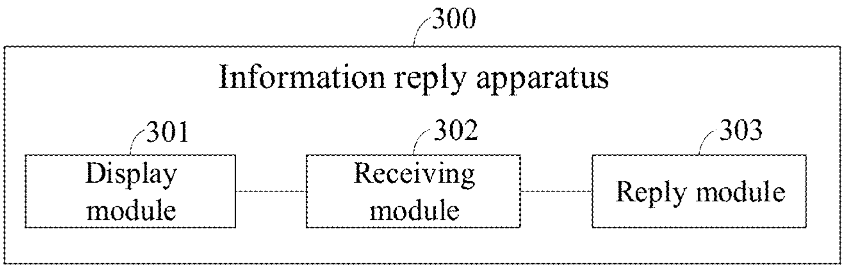
FIG. 3 is a structural diagram of an apparatus of information replying according to an embodiment of the disclosure.

FIG. 3 is a structural schematic diagram of an information reply apparatus according to an embodiment of the disclosure. Referring to FIG. 3, the information reply apparatus 300 according to this embodiment includes:

a display module 301, configured to display an entry control for entering an information presenting page in a creation page for a first multimedia content, and display the information presenting page in response to a trigger on the entry control, wherein the information presenting page includes one or more pieces of information including information obtained by replying to respective corresponding second multimedia content.

a receiving module 302, configured to receive a trigger on a target information in the information presenting page.

the display module 301 is further configured to in response to the trigger on the target information, display a sticker corresponding to the target information in the creation page for the first multimedia content.

a reply module, 303, configured to reply the target information through the first multimedia content.

In some possible embodiments, the receiving module 302 is further configured to receive a trigger on a first entry control in the capturing page for the first multimedia content, and the creation page includes the capturing page; the display module 301 is specifically configured to display the information presenting page in response to the trigger on the first entry control in the capturing page.

In some possible embodiments, the display module 301 is further configured to display a sticker page in the editing page for the first multimedia content, and the creation page includes the editing page; the receiving module 302 is further configured to receive a trigger on a second entry control in the sticker page; a display module 301 is specifically configured to present the information presenting page in response to the trigger on the second entry control in the sticker page.

In some possible embodiments, the receiving module 302 is further configured to receive a trigger on a third entry control in the editing page for the first multimedia content; the display module 301 is further configured to display the sticker page in the editing page in response to the trigger on the third entry control in the editing page, wherein the sticker page includes the second entry control, and the second entry control is used to enter the information presenting page.

In some possible embodiments, in the information presenting page, the width of the area corresponding to each piece of information is the same, and the one or more pieces of information are displayed in two columns.

In some possible embodiments, the receiving module 302 is further configured to receive triggers corresponding to multiple target information in the information presenting page respectively.

The display module 301 is specifically configured to display the first stickers corresponding to the plurality of target information respectively in the creation page for the first multimedia content, in response to the triggers corresponding to the plurality of target information respectively.

In some possible embodiments, the display module 301 is specifically used to display a publication page corresponding to the first multimedia content, and the publication page includes a target link, wherein the target link is used to be displayed in the playing page for the first multimedia content.

The reply module 303 is further configured to publish the first multimedia content and the target link in response to the trigger on the publication control in the publish page.

In some possible embodiments, the reply module 303 is specifically used to send the first multimedia content and the target information to the server device, so that the server device can send a notification message to a client associated with the target information; the notification message is used to notify the associated client that the target information has been replied to with the first multimedia content.

The information reply apparatus according to this embodiment can be used to implement the technical solution of any of the above-mentioned method embodiments, and their implementation principle and technical effect are similar, so please refer to the detailed description of the above-mentioned method embodiments, which will not be repeated here for brevity.

Figure 4:
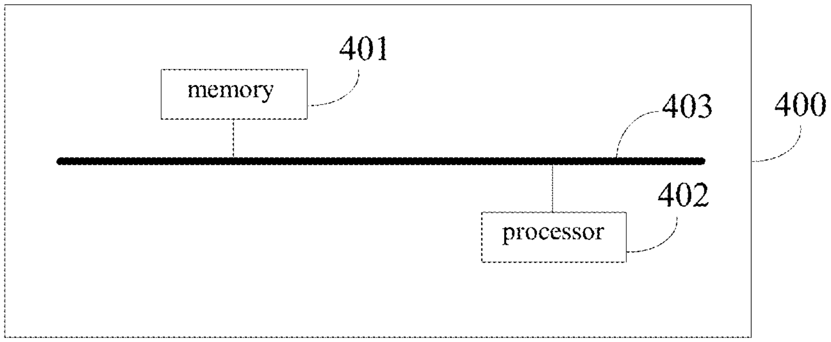
FIG. 4 is a structural diagram of an electronic device according to an embodiment of the disclosure.

FIG. 4 is a structural diagram of an electronic device provided by an embodiment of the disclosure. Referring to FIG. 4, the electronic device 400 provided by this embodiment includes a memory 401 and a processor 402.

The memory 401 can be a separate physical unit, and can be connected with the processor 402 through the bus 403. The memory 401 and the processor 402 can also be integrated together and implemented by hardware.

The memory 401 is used to store program instructions, and the processor 402 calls the program instructions to perform the operations of any of the above method embodiments.

Optionally, when part or all of the methods of the above embodiments are implemented by software, the above electronic device 400 may only include the processor 402. The memory 401 for storing programs is located outside the electronic device 400, and the processor 402 is connected to the memory through a circuit/wire for reading and executing the programs stored in the memory.

The processor 402 may be a central processing unit (CPU), a network processor (NP) or a combination of CPU and NP.

The processor 402 may further include a hardware chip. The above-mentioned hardware chip can be an application-specific integrated circuit (ASIC), a programmable logic device (PLD) or a combination thereof. The PLD can be a complex programmable logic device (CPLD), a field-programmable gate array (FPGA), a generic array logic (GAL) or any combination thereof.

The memory 401 may include volatile memory, such as random-access memory (RAM); The memory may also include non-volatile memory, such as flash memory, hard disk drive (HDD) or solid-state drive (SSD); The memory may also include a combination of the above-mentioned kinds of memories.

The disclosure also provides a computer-readable storage medium (also called as a readable storage medium) including computer program instructions, which, when executed by at least one processor of the electronic device, can implement the technical solution of any of the above method embodiments.

The disclosure also provides a program product including computer program instructions stored in a readable storage medium, from which at least one processor of the electronic device can read the computer program instructions, and the at least one processor executes the computer program instructions to cause the electronic device to execute the technical solution as in any method embodiment.

It should be noted that in this paper, relational terms such as “first” and “second” are only used to distinguish one entity or operation from another entity or operation, and do not necessarily require or imply any actual relationship or order between these entities or operations. Furthermore, the terms “include”, “including” or any other variant thereof are intended to cover non-exclusive inclusion, so that a process, method, article or equipment that includes a series of elements includes not only those elements, but also other elements not explicitly listed, or elements inherent to such process, method, article or equipment. Without further limitation, the element defined by the sentence “including a . . . ” does not exclude that there are other identical elements in the process, method, article or equipment including the element.

What has been described above is only a specific embodiment of the present disclosure, so that those skilled in the art can understand or realize the present disclosure. Many modifications to these embodiments will be obvious to those skilled in the art, and the general principles defined herein can be implemented in other embodiments without departing from the spirit or scope of this disclosure. Therefore, the present disclosure will not be limited to the embodiments described herein, but is to be accorded the widest scope consistent with the principles and novel features disclosed herein.

What is claimed is:

1. A method for information replying, comprising:

presenting a creation page for a first multimedia content to create the first multimedia content, wherein the creation page contains a control capable of acquiring target information as information to be replied, wherein the target information is obtained by commenting on or replying to corresponding second multimedia content;

acquiring the target information in response to a trigger on the control;

in response to a trigger on the target information, displaying a sticker corresponding to the target information in the creation page for the first multimedia content, and after creation of the first multimedia content, replying to the target information in form of multimedia through publishing the created first multimedia content comprising the sticker, wherein the sticker containing the target information is displayed on a playing interface of the created first multimedia content after publication of the created first multimedia content.

2. The method of claim 1, wherein, the control comprises a first entry control for entering an information presenting page, and the acquiring the target information in response to the trigger on the control, comprises:

displaying the information presenting page in the creation page for the first multimedia content in response to a trigger on the first entry control, wherein the information presenting page comprises the target information.

3. The method of claim 2, wherein, the information presenting page comprises one or more pieces of information, wherein the one or more pieces of information comprises information obtained by commenting on or replying to respective corresponding second multimedia contents, and wherein the target information is selected from the one or more pieces of information.

4. The method of claim 1, wherein, the control comprises a third entry control for entering a sticker presentation page, and the acquiring the target information in response to the trigger on the control, comprises:

presenting the sticker presentation page in the creation page for the first multimedia content in response to a trigger on the third entry control, wherein the sticker presentation page comprises a second entry control capable of acquiring the target information, and acquiring the target information in response to a trigger on the second entry control.

5. The method of claim 4, wherein, the acquiring the target information in response to the trigger on the second entry control, comprises:

displaying the information presenting page in the creation page for the first multimedia content in response to the trigger on the second entry control, wherein the information presenting page comprises the target information.

6. The method of claim 1, wherein, the information presenting page comprises one or more pieces of information, and the target information comprises at least one piece of information selected from the one or more pieces of information.

7. The method of claim 1, wherein, the creation page for the first multimedia content comprises at least one of a capturing page for the first multimedia content and an editing page for the first multimedia content.

8. The method of claim 1, wherein, in the information presenting page, each area corresponding to each piece of information has the same width, and the one or more pieces of information are displayed in two columns.

9. The method of claim 1, wherein, the target information comprises a plurality of information in the information presenting page, and wherein the trigger on the target information, comprises:

triggers corresponding to a plurality of target information in the information presenting page respectively;

the displaying the sticker corresponding to the target information in the creation page for the first multimedia content in response to the trigger on the target information comprises:

in response to triggers corresponding to the plurality of target information respectively, displaying first stickers corresponding to the plurality of target information respectively in the creation page for the first multimedia content.

10. The method of claim 1, wherein, the replying to the target information through the first multimedia content, comprises:

displaying a publication page corresponding to the first multimedia content, wherein the publication page comprises a target link, wherein the target link is used for being displayed in a playing page for the first multimedia content;

publishing the first multimedia content and the target link in response to a trigger on a publication control in the publication page.

11. The method of claim 1, wherein, the replying to the target information through the first multimedia content further comprises:

sending the first multimedia content and the target information to a server device, so that the server device sends a notification message to a client associated with the target information; wherein the notification message is used to notify the associated client that the first multimedia content has been used to reply to the target information.

12. The method of claim 1, wherein the sticker at least comprises at least one user information and text content corresponding to the target information.

13. An electronic device, wherein, the electronic device comprises:

a memory, a processor and computer program instructions;

the memory is configured to store the computer program instructions;

the processor is configured to execute the computer program instructions to implement:

presenting a creation page for a first multimedia content to create the first multimedia content, wherein the creation page contains a control capable of acquiring target information as information to be replied, wherein the target information is obtained by commenting on or replying to corresponding second multimedia content;

acquiring the target information in response to a trigger on the control;

in response to a trigger on the target information, displaying a sticker corresponding to the target information in the creation page for the first multimedia content, and after creation of the first multimedia content, replying to the target information in form of multimedia through publishing the created first multimedia content comprising the sticker, wherein the sticker containing the target information is displayed on a playing interface of the created first multimedia content after publication of the created first multimedia content.

14. The electronic device of claim 13, wherein, the control comprises a first entry control for entering an information presenting page, and the acquiring the target information in response to the trigger on the control, comprises:

displaying the information presenting page in the creation page for the first multimedia content in response to a trigger on the first entry control, wherein the information presenting page comprises the target information.

15. The electronic device of claim 13, wherein, the control comprises a third entry control for entering a sticker presentation page, and the acquiring the target information in response to the trigger on the control, comprises:

presenting the sticker presentation page in the creation page for the first multimedia content in response to a trigger on the third entry control, wherein the sticker presentation page comprises a second entry control capable of acquiring the target information, and acquiring the target information in response to a trigger on the second entry control.

16. The electronic device of claim 13, wherein, the target information comprises a plurality of information in the information presenting page, and wherein the trigger on the target information, comprises:

triggers corresponding to a plurality of target information in the information presenting page respectively;

the displaying the sticker corresponding to the target information in the creation page for the first multimedia content in response to the trigger on the target information comprises:

in response to triggers corresponding to the plurality of target information respectively, displaying first stickers corresponding to the plurality of target information respectively in the creation page for the first multimedia content.

17. A non-transitory computer readable storage medium comprising: computer program instructions that, when running on an electronic device, cause the electronic device to implement:

presenting a creation page for a first multimedia content to create the first multimedia content, wherein the creation page contains a control capable of acquiring target information as information to be replied, wherein the target information is obtained by commenting on or replying to corresponding second multimedia content;

acquiring the target information in response to a trigger on the control;

in response to a trigger on the target information, displaying a sticker corresponding to the target information in the creation page for the first multimedia content, and after creation of the first multimedia content, replying to the target information in form of multimedia through publishing the created first multimedia content comprising the sticker, wherein the sticker containing the target information is displayed on a playing interface of the created first multimedia content after publication of the created first multimedia content.

18. The non-transitory computer readable storage medium of claim 17, wherein, the control comprises a first entry control for entering an information presenting page, and the acquiring the target information in response to the trigger on the control, comprises:

displaying the information presenting page in the creation page for the first multimedia content in response to a trigger on the first entry control, wherein the information presenting page comprises the target information.

19. The non-transitory computer readable storage medium of claim 17, wherein, the control comprises a third entry control for entering a sticker presentation page, and the acquiring the target information in response to the trigger on the control, comprises:

presenting the sticker presentation page in the creation page for the first multimedia content in response to a trigger on the third entry control, wherein the sticker presentation page comprises a second entry control capable of acquiring the target information, and acquiring the target information in response to a trigger on the second entry control.

20. The non-transitory computer readable storage medium of claim 17, wherein, the target information comprises a plurality of information in the information presenting page, and wherein the trigger on the target information, comprises:

triggers corresponding to a plurality of target information in the information presenting page respectively;

the displaying the sticker corresponding to the target information in the creation page for the first multimedia content in response to the trigger on the target information comprises:

in response to triggers corresponding to the plurality of target information respectively, displaying first stickers corresponding to the plurality of target information respectively in the creation page for the first multimedia content.

* * * * *